(12) United States Patent
Kuznetsov

(10) Patent No.: US 11,632,021 B2
(45) Date of Patent: Apr. 18, 2023

(54) DYNAMO-ELECTRIC MACHINE

(71) Applicant: Raytheon Company, Waltham, MA (US)

(72) Inventor: Stephen B. Kuznetsov, Waltham, MA (US)

(73) Assignee: RAYTHEON COMPANY, Waltham, MA (US)

( * ) Notice: Subject to any disclaimer, the term of this patent is extended or adjusted under 35 U.S.C. 154(b) by 157 days.

(21) Appl. No.: 17/222,489

(22) Filed: Apr. 5, 2021

(65) Prior Publication Data

US 2022/0320935 A1    Oct. 6, 2022

(51) Int. Cl.
| | |
|---|---|
| *H02K 11/33* | (2016.01) |
| *H02K 1/16* | (2006.01) |
| *H02K 29/03* | (2006.01) |

(52) U.S. Cl.
CPC .............. *H02K 11/33* (2016.01); *H02K 1/16* (2013.01); *H02K 29/03* (2013.01); *H02K 2201/03* (2013.01); *H02K 2213/03* (2013.01)

(58) Field of Classification Search
CPC .......... H02K 11/33; H02K 1/16; H02K 29/03; H02K 2201/03; H02K 2213/03; H02K 3/12; H02K 7/025; H02K 19/34; H02K 17/02; H02K 19/00; H02K 19/02; H02K 3/16; H02K 3/47; H02K 17/42; H02K 17/00; Y02E 60/16; H02P 25/24
See application file for complete search history.

(56) References Cited

U.S. PATENT DOCUMENTS

| | | | |
|---|---|---|---|
| 4,477,760 A | 10/1984 | Kuznetsov | |
| 4,489,265 A | 12/1984 | Kuznetsov | |
| 4,532,458 A | 7/1985 | Kuznetsov et al. | |
| 4,579,167 A | 4/1986 | Kuznetsov | |
| 4,581,555 A | 4/1986 | Kuznetsov et al. | |
| 4,602,179 A | 7/1986 | Kuznetsov et al. | |
| 4,635,705 A | 1/1987 | Kuznetsov | |
| 4,693,299 A | 9/1987 | Kuznetsov et al. | |

(Continued)

FOREIGN PATENT DOCUMENTS

RU    2524144 C2    7/2014

OTHER PUBLICATIONS

International Search Report for International Patent Application No. PCT/US2022/022535, dated Aug. 11, 2022, (4 pages).

(Continued)

*Primary Examiner* — Tulsidas C Patel
*Assistant Examiner* — Viswanathan Subramanian
(74) *Attorney, Agent, or Firm* — Burns & Levinson, LLP; Joseph M. Maraia

(57) ABSTRACT

An example system includes a dynamo-electric machine. The dynamo-electric machine includes a rotor that is cylindrical and that is configured for rotation and a stator that is arranged relative to the rotor. The stator has a stepped configuration that defines a first diameter for the stator and a second diameter for the stator. The first diameter is greater than the second diameter. Zones of the stator at the first diameter hold direct-axis (D-axis) windings and zones of the stator at the second diameter hold quadrature axis (Q-axis) windings. An airgap between the rotor and the Q-axis windings is greater than an airgap between the rotor and the D-axis windings.

28 Claims, 23 Drawing Sheets

(56) References Cited

U.S. PATENT DOCUMENTS

| | | |
|---|---|---|
| 5,433,149 A | 7/1995 | Kuznetsov |
| 5,483,111 A | 1/1996 | Kuznetsov |
| 5,596,469 A | 1/1997 | Kuznetsov |
| 5,628,252 A | 5/1997 | Kuznetsov |
| 5,642,249 A | 6/1997 | Kuznetsov |
| 5,666,883 A | 9/1997 | Kuznetsov |
| 5,868,077 A | 2/1999 | Kuznetsov |
| 5,904,101 A | 5/1999 | Kuznetsov |
| 6,064,172 A | 5/2000 | Kuznetsov |
| 6,066,905 A * | 5/2000 | Wright .............. H02K 3/20 310/260 |
| 8,436,504 B2 | 5/2013 | Liang et al. |
| 9,306,386 B2 | 4/2016 | Kuznetsov |
| 9,373,963 B2 | 6/2016 | Kuznetsov |
| 9,531,247 B2 | 12/2016 | Kuznetsov |
| 9,531,289 B2 | 12/2016 | Kuznetsov |
| 9,667,232 B2 | 5/2017 | Kuznetsov |
| 9,705,314 B2 | 7/2017 | Kuznetsov |
| 9,837,996 B2 | 12/2017 | Kuznetsov |
| 9,911,532 B2 | 3/2018 | Gupta et al. |
| 10,298,212 B2 | 5/2019 | Kuznetsov |
| 10,491,074 B2 | 11/2019 | Kuznetsov |
| 10,958,254 B1 | 3/2021 | Kuznetsov |
| 10,985,563 B2 | 4/2021 | Kuznetsov |
| 11,038,398 B2 | 6/2021 | Kuznetsov |
| 11,183,846 B2 | 11/2021 | Kuznetsov |
| 2013/0285491 A1 | 10/2013 | Kuznetsov |
| 2014/0346868 A1 | 11/2014 | Kuznetsov |
| 2015/0077893 A1 | 3/2015 | Kuznetsov |
| 2015/0288271 A1 | 10/2015 | Kuznetsov |
| 2016/0055971 A1 | 2/2016 | Gupta et al. |
| 2016/0181793 A1 | 6/2016 | Kuznetsov |
| 2016/0197600 A1 | 7/2016 | Kuznetsov |
| 2016/0336891 A1 | 11/2016 | Seguchi |
| 2016/0336928 A1 | 11/2016 | Kuznetsov |
| 2017/0023310 A1 | 1/2017 | Hemker et al. |
| 2017/0063192 A1 | 3/2017 | Kuznetsov |
| 2018/0159515 A1 | 6/2018 | Kuznetsov |
| 2019/0036336 A1 | 1/2019 | Kuznetsov |
| 2019/0199094 A1 | 6/2019 | Kuznetsov |
| 2019/0393754 A1 | 12/2019 | Kuznetsov |
| 2020/0395764 A1 | 12/2020 | Kuznetsov |
| 2020/0395784 A1 | 12/2020 | Kuznetsov |
| 2021/0075217 A1 | 3/2021 | Kuznetsov |
| 2021/0218390 A1 | 7/2021 | Kuznetsov |
| 2021/0344331 A1 | 11/2021 | Kuznetsov et al. |
| 2021/0351588 A1 | 11/2021 | Kuznetsov |
| 2021/0376610 A1 | 12/2021 | Kuznetsov |

OTHER PUBLICATIONS

Written Opinion for International Patent Application No. PCT/US2022/022535, dated Aug. 11, 2022, (8 pages).

* cited by examiner

DYNAMO-ELECTRIC MACHINE

TECHNICAL FIELD

This specification describes examples of a dynamo-electric machine having non-uniform airgaps between its stator and rotor bores, and to applications therefor.

BACKGROUND

High-density dynamo-electric machines, such as induction motors, employ a primary or stator member having a uniform airgap between a stator bore and an associated rotor outer diameter. The basic magnetic reluctance in the machine's direct and quadrature axes may therefore be identical this case. Differences in output reactance may be obtained in such machines by changing direct and quadrature axis winding parameters such as number of turns, chording, or distribution factors.

SUMMARY

An example system includes a dynamo-electric machine. The dynamo-electric machine includes a rotor that is cylindrical and that is configured for rotation and a stator that is arranged relative to the rotor. The stator has a stepped configuration that defines a first diameter for the stator and a second diameter for the stator. The first diameter is greater than the second diameter. Zones of the stator at the first diameter hold direct-axis (D-axis) windings and zones of the stator at the second diameter hold quadrature axis (Q-axis) windings. An airgap between the rotor and the Q-axis windings is greater than an airgap between the rotor and the D-axis windings. The example system may include one or more of the following features, either alone or in combination.

The stator may include neutralizing windings between or among sets of the D-axis windings and the Q-axis windings. The neutralizing windings may be configured to change an airgap radial flux between adjacent D-axis windings and Q-axis windings. The system may include an inertial energy storage device to power the D-axis windings to enable the rotation when the rotor is disconnected from an external supply of power.

The Q-axis windings may be configured to output energy to a load. The dynamo-electric machine may be configured to power the D-axis windings through an external source until the rotor reaches a predefined speed, after which the D-axis windings may be powered by the inertial energy storage device. While the D-axis windings are powered by the inertial energy storage device, the dynamo-electric machine is configured to output energy from the D-axis windings that boosts the energy output by the Q-axis windings. The energy from the D-axis windings may be superimposed on the energy output by the Q-axis windings. Boosting the energy output by the Q-axis windings may include at least one of adding current or voltage to current or voltage output by the D-axis windings. Electrical reactance of the Q-axis windings may be lower than electrical reactance of the D-axis windings based on differences in radial airgaps associated with the Q-axis windings and the D-axis windings. A combined energy from the Q-axis windings and the D-axis windings may be pulsed or continuous. A combined energy from the Q-axis windings and the D-axis windings may be at an end of a rising power output of the Q-axis windings.

The dynamo-electric machine may be configured to output energy from the D-axis windings that boosts energy output to a load from the Q-axis windings. The system may include a transformer between the dynamo-electric machine and the load. The transformer may be configured to receive current from the D-axis windings and from the Q-axis windings and to generate boosted energy output to the load based on the current from the D-axis windings and from the Q-axis windings.

As noted, the dynamo-electric machine may be configured to output energy from the D-axis windings that boosts energy output to a load from the Q-axis windings. The dynamo-electric machine may include a switch that is controllable to interrupt a circuit between the dynamo-electric machine and the load. Interruption of the circuit may coincide with injection of energy from the D-axis windings. The interruption of the circuit may produce transient voltage and transient current that boosts energy output from the Q-axis windings. The transient voltage and current may increase a rate of rise of the energy output from the Q-axis windings. The transient voltage and current may increase a total energy output to the load. The transient voltage and current may produce a pulsed energy output to the load. The Q-axis windings, the switch, and the D-axis windings may produce a current loop that is interrupted by controlled opening of the switch. Output current from the D-axis windings may circulate in a closed loop until the current reaches a target value, at which time the switch is controllable to interrupt the circuit between the dynamo-electric machine and the load.

The system may include circuitry to change the D-axis windings from a polyphase input to a single-phase alternative current (AC) excitation, thereby causing a spatial-peripheral shift in airgap flux of the D-axis windings and, as a result, boosting energy output by the Q-axis windings.

As noted, the dynamo-electric machine is configured to output energy from the D-axis windings that boosts energy output to a load from the Q-axis windings. The system may include a rectifier to rectify a current component of the energy from AC (alternating current) to DC (direct current). The system may also include inductive storage to receive the current from the rectifier to boost the output energy from the Q-axis windings. The load may include a pulse forming network (PFN) having inductive and capacitive components. The PFN may be for producing shaped pulses. The system may include a subharmonic filter to extract subharmonics from a rectifier along an output of the Q-axis windings, and a thyristor modulator to feed the subharmonics into the D-axis windings upon separation of the induction machine from external power. The subharmonics may include reactive power.

As noted, the dynamo-electric machine may be configured to output current from the D-axis windings that boosts energy output to a load from the Q-axis windings. The system may include a harmonic filter that forms a resonant circuit with the D-axis windings, where harmonic filter is connected to an output current port from the D-axis windings; a boost transformer in series with the harmonic filter to receive the current from the harmonic filter and to boost the current; and a polyphaser rectifier to receive the boosted current and to provide a rectified output based on the boosted current to boost the energy output to the load.

As noted, the dynamo-electric machine may be configured to output current from the D-axis windings that boosts energy output to a load from the Q-axis windings. The system may include a boost transformer along an output of the D-axis windings to receive current from the D-axis windings; a rectifier to rectify an output of the boost transformer; a pulse forming network having storage elements that charge based a rectified output from the pulse forming network; and a switch that is triggerable to output energy from the pulse forming network to combine with the energy output from the Q-axis windings. The switch may include a spark gap switch, and the system may include capacitive storage to store the energy output from the Q-axis windings and an inertial storage device that transfers energy with the capacitive storage and the pulse forming network during operation of the induction machine.

The D-axis windings may be configured to receive a polyphase input. Interruption of the polyphase input may produce negative sequence primary current in the D-axis windings. The system may include neutralizing windings that are switchable into a closed short-circuiting loop that induces transient voltage in the D-axis windings or the Q-axis windings. The negative sequence primary current may produce the transient voltage boosting output voltage to a load from the Q-axis windings.

The induction machine may include a polyphase wound rotor induction machine configured to receive a polyphase input. A change in magnitude or phase displacement of the polyphase input may produce negative sequence primary current in the D-axis windings. The system may include neutralizing windings that are switchable into a closed short-circuiting loop that induces transient voltages in the D-axis windings and the Q-axis windings. The transient voltages initiated by the rotor induction machine may create a boost in output voltage to a load from the Q-axis windings.

The system may include a polyphase source to provide excitation to the D-axis windings. The polyphase source may be controllable to provide pulsed single-phase excitation to the D-axis windings. A change in excitation to the D-axis windings from polyphase to single-phase may cause a negative sequence current through the D-axis windings that results in a flux compression effect within a magnetic field of the airgap between the rotor and the Q-axis windings and the airgap between the rotor and the D-axis windings. The flux compression may affect changing effective impedance associated with the D-axis windings and Q-axis windings.

The Q-axis windings may be configured to output energy a load. The load may include a pulse forming network and a radar system.

As noted, the dynamo-electric machine may be configured to output current from the D-axis windings that boosts energy output to a load from the Q-axis windings. The system may include a thyristor modulator to control real and reactive components of power to affect power applied to the load, and inductive storage to receive current from the thyristor modulator for boosting the output energy from the Q-axis windings.

Any two or more of the features described in this specification, including in this summary section, may be combined to form implementations not specifically described in this specification.

The apparatus, systems, and/or components thereof described herein may be configured, for example, through design, construction, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Example dynamo-electric machines include induction machines, such as induction motors, and wound-field synchronous machines. The structures and systems described herein may be used with any appropriate type of dynamoelectric machines even though the examples presented below focus on induction machines.

Figure 1:
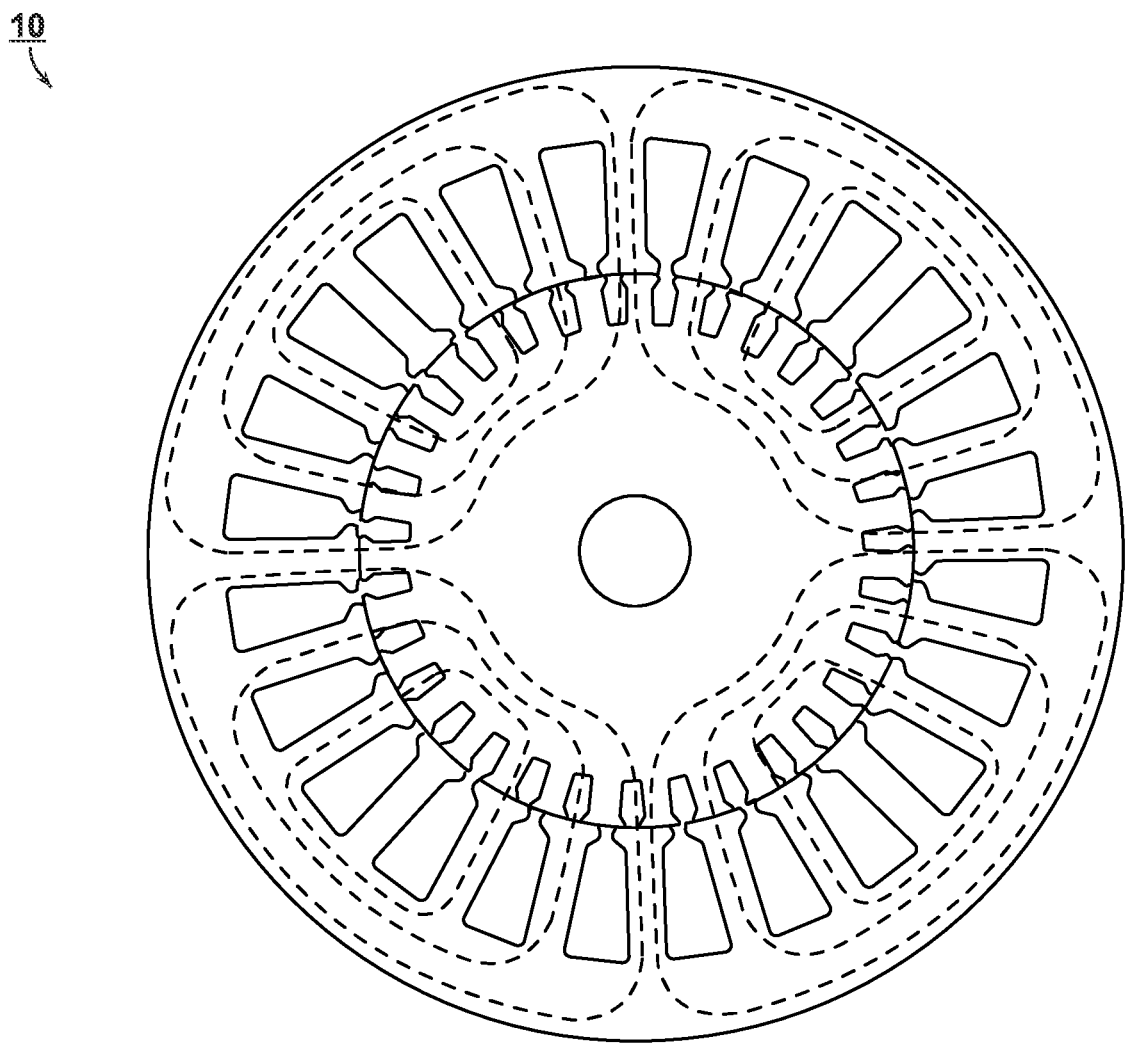
FIG. 1 is a cut-away view of an example induction machine.

An example induction machine includes an electric motor in which electric current in a rotor that produces motor torque is generated by electromagnetic induction from a magnetic field produced by a stator winding. An induction machine may also be used to provide pulsed power to loads using a stator assembly having multiple independent windings. Induction machine 10 of FIG. 1 has a stator assembly that includes a cylindrical structure having a uniform bore diameter. Multiple stator slots are arranged around this uniform bore diameter to hold either input or output windings. In a stator assembly such as that of FIG. 1, the magnetic airgap reluctance between cylindrical rotor laminations and the stator bore is substantially uniform around the stator bore, except for minor perturbations. Electromagnetic principles such as flux compression, for example in the range of 0.5 Tesla (T) to 2.0 T, may be applied to the stator assembly to provide pulsed power to loads including, but not limited to, radar systems.

Figure 2:
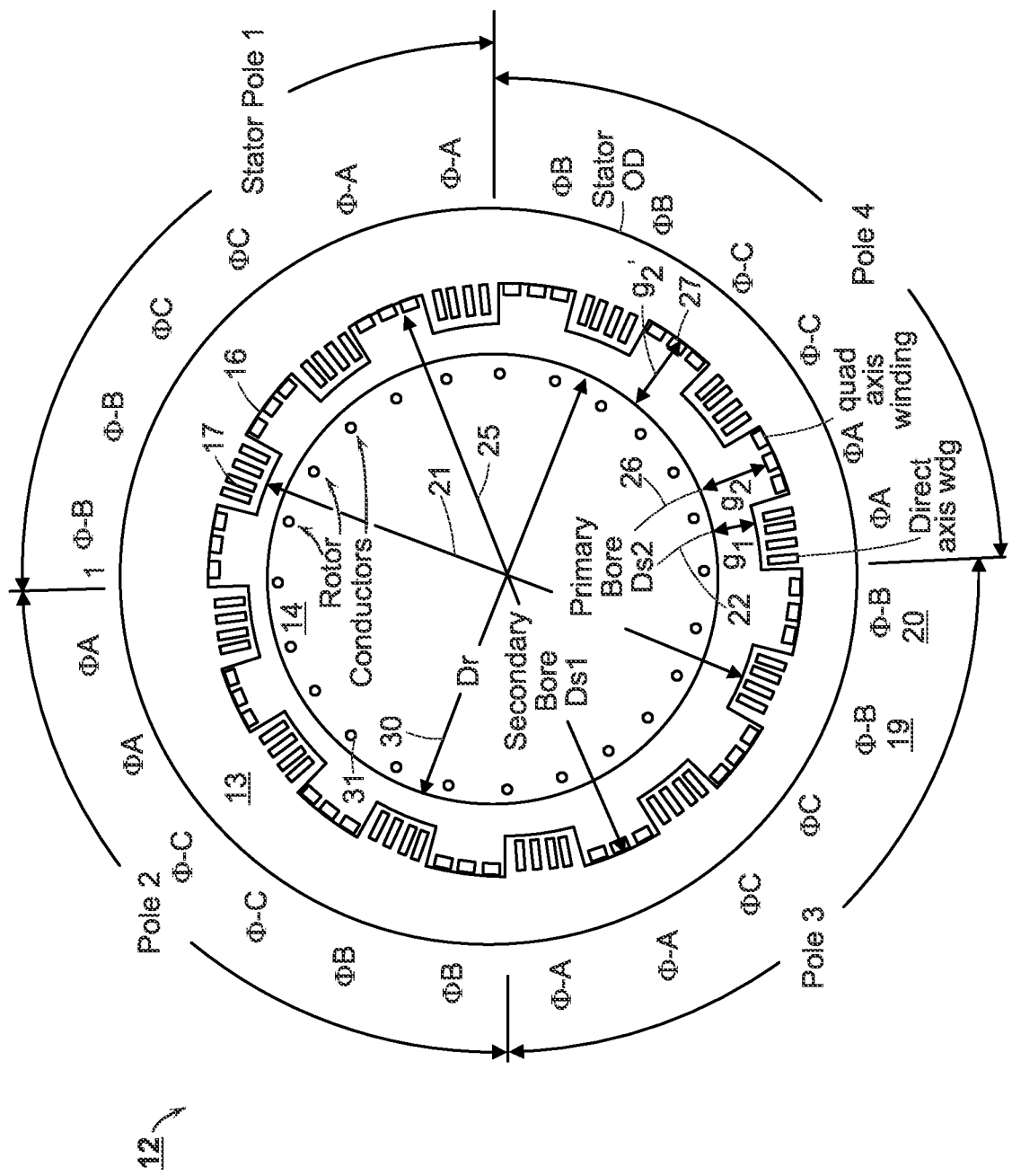
FIG. 2 is a cut-away view of an example induction machine having non-uniform airgaps between its stator assembly and rotor bores.

FIG. 2 is a cross-section of example induction machine 12, which includes stator assembly 13 and cylindrical rotor 14. Induction machine 12 may be an induction motor having generator functionality as described herein. In contrast to the stator assembly of FIG. 1, stator assembly 12 includes stepped periodic changes in the stator or primary bore diameter to create zones and windings having high and low magnetic airgap reluctances. Magnetic energy stored in these stator airgaps changes when there is a change in radial airgap dimension, with the larger airgap zones storing, e.g., four to five times as much energy as the smaller airgap zones. In this context, "high" and "low" magnetic airgap reluctance do not have any specific numerical connotations, but rather are used to indicate relative levels of magnetic airgap reluctance.

Example stator assembly 13 is 4-pole structure that includes at least two different and electrically-isolated sets of stator windings 16, 17. Although both types of windings repeat around the entire circumference of stator assembly 13, the relative peripheral allocations to windings 16 and 17 are a design variable. In this example, each winding phase of 30 electrical degrees occupies 15 mechanical degrees, such as 19 and 20. Stator assembly 13 includes two different bore diameters aside from a normal slot opening. Primary bore diameter $D_{s1}$ 21 is for source power input windings which, as a result of the primary bore diameter $D_{s1}$, have radial airgap $g_1$ 22. These windings are enclosed in magnetic slots established by magnetic lamination steel, for example. The secondary bore diameter $D_{s2}$ 25 is for output or power output windings which, as a result of the primary bore diameter $D_{s2}$, have a radial airgap $g_2$ 26. Power is input to input windings and output from both the input and output windings, as described herein.

The input windings include direct (D) axis windings 17 and have the smaller of the two radial airgaps. This configuration produces a high magnetic reluctance, a high leakage inductance (Xl), and a high magnetizing reactance (Xm) relative to the output windings, which are described below. The relative values of these parameters may be advantageous for operating the D-axis windings from a source of power, such as a prime mover or AC (alternating current) main transmission line. The output windings are quadrature (Q) axis windings 16 and have the larger of the two radial airgaps. This configuration produces a higher magnetic reluctance and a lower leakage reactance than the input windings. The relatively low leakage reactance may yield high current output on the Q-axis axis windings having a time constant that is smaller than on the D-axis windings. The Q-axis windings may include airgap windings containing conductors that are mechanically retained by a non-magnetic structure. As a result, the effective radial airgap may be yet larger at $g_2'$ 27, which may be advantageous for pulsed power output loading as described herein. The individual windings may be either concentric-coil windings or double-layer lap windings wound or a combination thereof.

Cylindrical rotor 14 may have a uniform outer diameter 30 and a regular spacing of rotor conductors 31 around a circumference of rotor 14. Rotor 14 may be or include a cage rotor. Rotor 14 may be or include a polyphase wound AC rotor or a DC (direct current) wound rotor, each of which may receive external excitation. In an example implementation, rotor 14 has a wound-rotor structure enabling external excitation of the rotor, which enables controlling a slip frequency $\omega_0$ of the rotor to any shaft speed of interest. Slip frequency in combination with rotor current amplitude ultimately controls the power output of the induction machine. For example, when the induction machine of FIG. 2 is controlled to operate as an inertial storage or pulsed power generator (as described below), as shaft speed decreases following a pulsed discharge, a rotor excitation controller continuously boosts the excitation applied frequency $\omega_r$ to yield a stator output frequency that is nearly constant for the duration of the discharge pulse.

Figure 18:
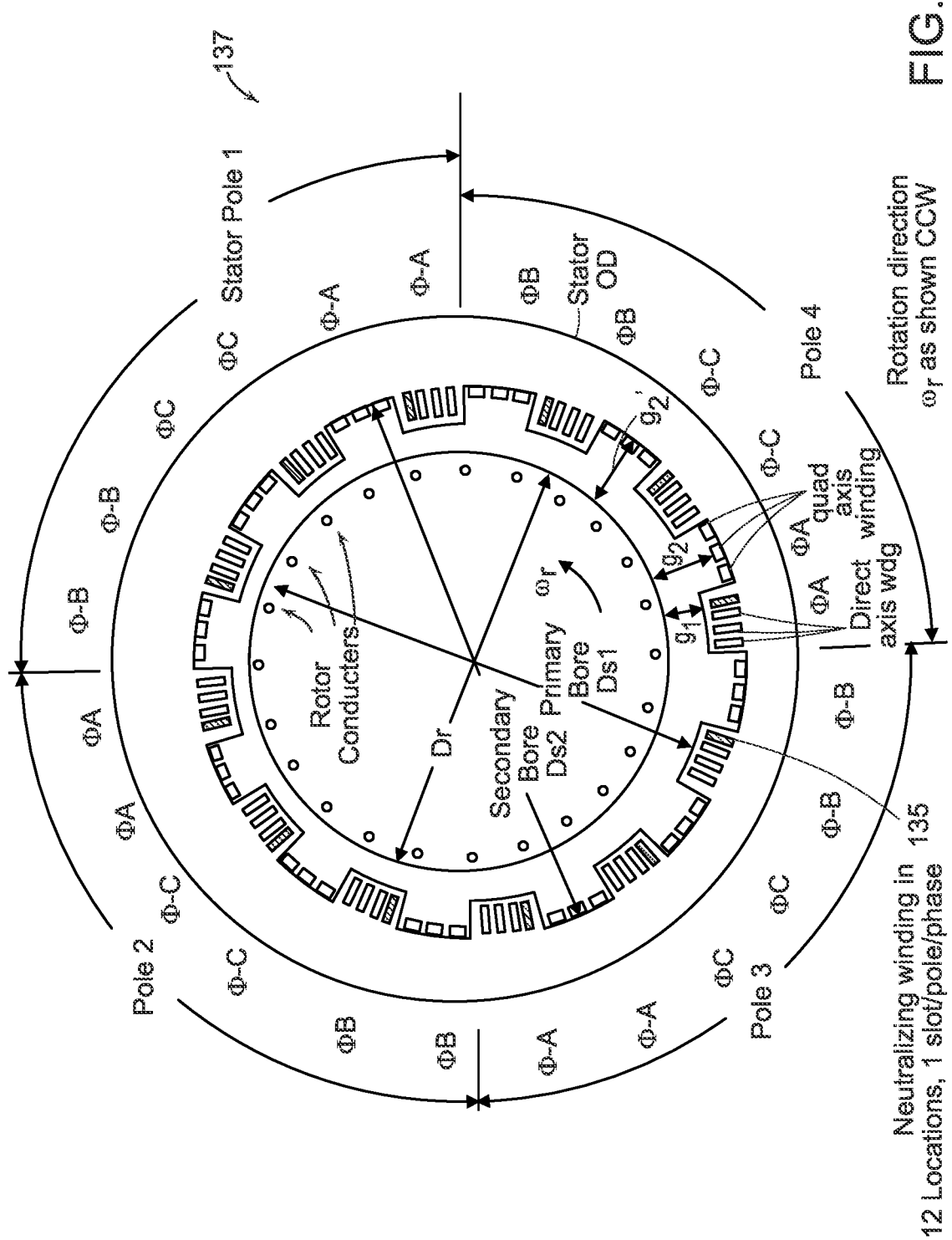
FIG. 18 is a cut-away view of another example induction machine having non-uniform airgaps between its stator and rotor bores.

The configuration of induction machine 12 thus provides spatial variation in the magnetic reluctance between stator and rotor structures and, consequently, lowers the quadrature-axis output reactance. Example induction machine 12 also includes a neutralizing stator winding insertion ("neutralizing winding") every 30 or 60 electrical degrees, which may aid in flux compression and in magnetically isolating the D-axis windings from the Q-axis windings. The neutralizing winding has total galvanic isolation from the D-axis and Q-axis windings and has separate control devices. An implementation including D-axis neutralizing stator windings is shown in FIG. 18.

This galvanic isolation enables induction machine 12 to include input (D-axis) and output (Q-axis) windings in a single machine having a common magnetic core and a common structure. Furthermore, since stator assembly 13 changes the main magnetic reluctance of the input and output windings as function their bore diameters, inherent leakage reactance and magnetizing reactance of the stator windings can have two or more values within stator assembly 13. This creates a flux compression effect, which allows for shifting of the airgap radial magnetic flux on a continuous basis. In the examples described herein, zones that generate pulsed power may have four times as much inherent stored energy in their airgaps as the zones used for motoring functions.

In this regard, the output windings of induction machine 12 and its variants described herein may be used to generate pulsed or continuous power, including either polyphase or single phase power, which may be used to power various loads including, but not limited to, radar systems. For example, the output windings may be used to power pulsed loads having time-varying load power or varying power factors as a function of time. The input windings of induction machine 12 and its variants described herein may be used to generate pulsed or continuous power, which may be either polyphase or single phase power, and which may be used to power motoring functions, including torque production of the rotor. Additionally, the input windings of induction machine 12 and its variants described herein may be used to generate pulsed or continuous power, which may be either polyphase or single phase power, and which may be used to boost (that is, to increase or to augment) the power provided by the output windings. The power produced by the output windings is generally at a lower reactance than the power produced by the input windings. The lower output reactance of the output windings may enhance energy and power delivery.

In addition to relatively low output reactance at the output windings, example induction machine 12 and its variants described herein may be configured to generate a repeatable stream of relatively high voltage and time-varying voltage pulses having relatively fast rise times. In its motoring mode, the D-axis windings of stator assembly 12 provide input energy to an inertial energy store to bring rotor 14 up to a base speed or to maintain its speed over moderate or long durations prior to a discharge cycle. After the D-axis windings have served this purpose, those same D-axis windings may be configured and controlled to generate high voltage pulses. In an example implementation, the D-axis winding output (voltage pulses) may be superimposed on the Q-axis winding output (current pulses) to provide both a high current pulse to a load such as those described herein and also a high voltage pulse to that same load. The superimposed pulses need not occur at the exact same time. For example, there may be an operational advantage to having the Q-axis winding peak first, yielding a current pulse followed by a subsequent peak of a controlled D-axis voltage pulse. Superposition of the pulses boost the amount of energy to the load. The boosted energy may include boosted current, boosted voltage, and/or boosted power.

Figure 3A:
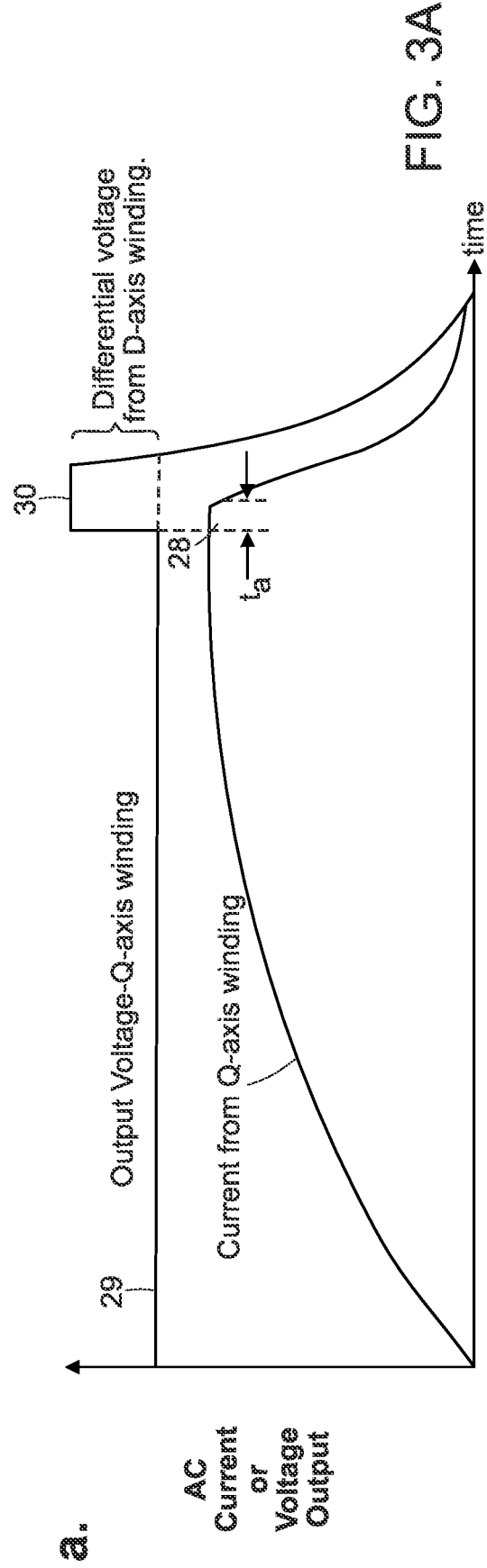
FIG. 3A is a graph showing an example voltage boost output by an induction machine that occurs in advance of a Q-axis winding current peak.
Figure 3B:
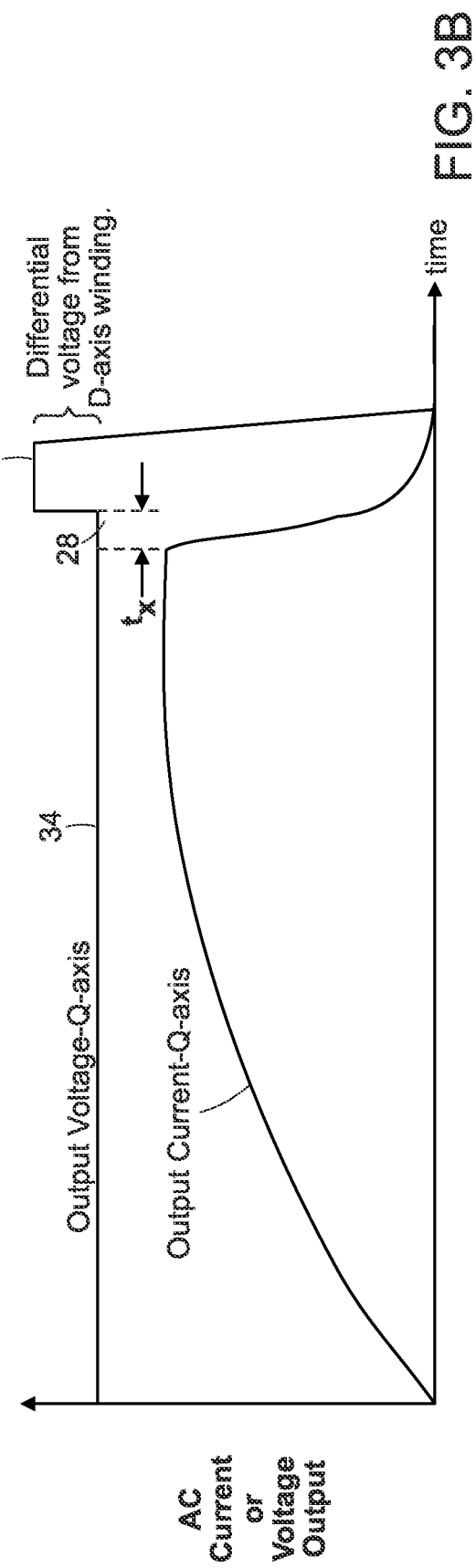
FIG. 3B is a graph showing an example voltage boost output by an induction machine that occurs after a Q-axis winding current peak.
Figure 3C:
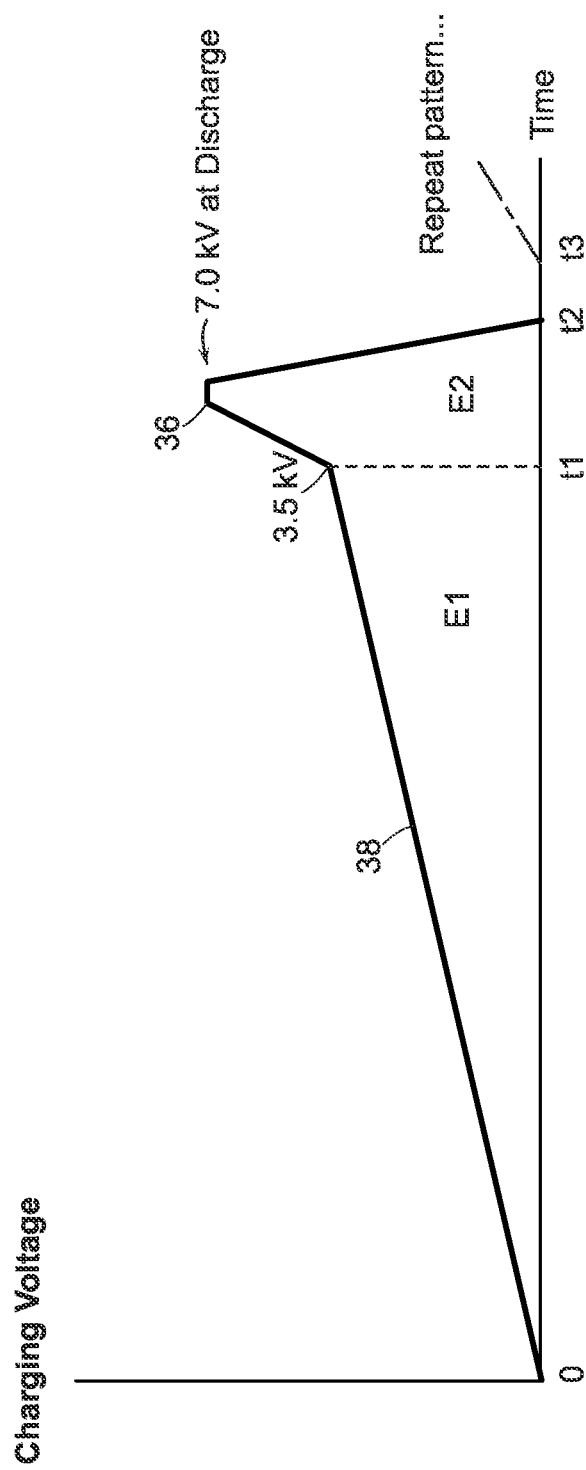
FIG. 3C is a graph showing an example voltage boost output by an induction machine at an end of an overall pulse.

In this regard, some types of pulsed power loads may require voltage-current characteristics such as those shown in FIG. 3A, 3B, or 3C. FIG. 3A shows an example in which the Q-axis windings deliver a main output current pulse 28 at a time period "ta" in advance of the current pulse shutting-off. The D-axis winding output is superimposed upon the Q-axis voltage 29 to produce a boost output voltage 30. This type of boost output voltage may be required in certain types of pulsed power loads. FIG. 3B shows an example in which the Q-axis winding delivers output voltage 32 at a time period "tx", which is delayed from a peak following current shut-off. The D-axis winding output is superimposed upon the Q-axis voltage 34 to produce the boost output voltage 35. This type of boost output voltage may be required in certain types of pulsed power loads. FIG. 3C shows a boost voltage 36 that may be generated by superimposing outputs from the Q-axis windings and the D-axis windings as described herein. The boost output voltage is sharp, appears at end of an overall pulse 38, starts at time t1, and has energy E2 from the D-axis windings that produces a faster rise time than the rise time from an initial energy E1 from the Q-axis winding. At time t2 the pulse has decayed to zero output and at time t3 the repetition pattern starts again. The initial energy E1 is typically larger than energy E2 although in some cases the energy E2 can be larger than energy E1. It is clear that the energy ramp rates or rising slopes of E1 and E2 can be widely different. The example output current and voltage in FIGS. 3A, 3B, and 3C are AC quantities. The techniques described herein may also be used if the machine output from the Q-axis windings and the D-axis windings is rectified to be a DC output.

Figure 4:
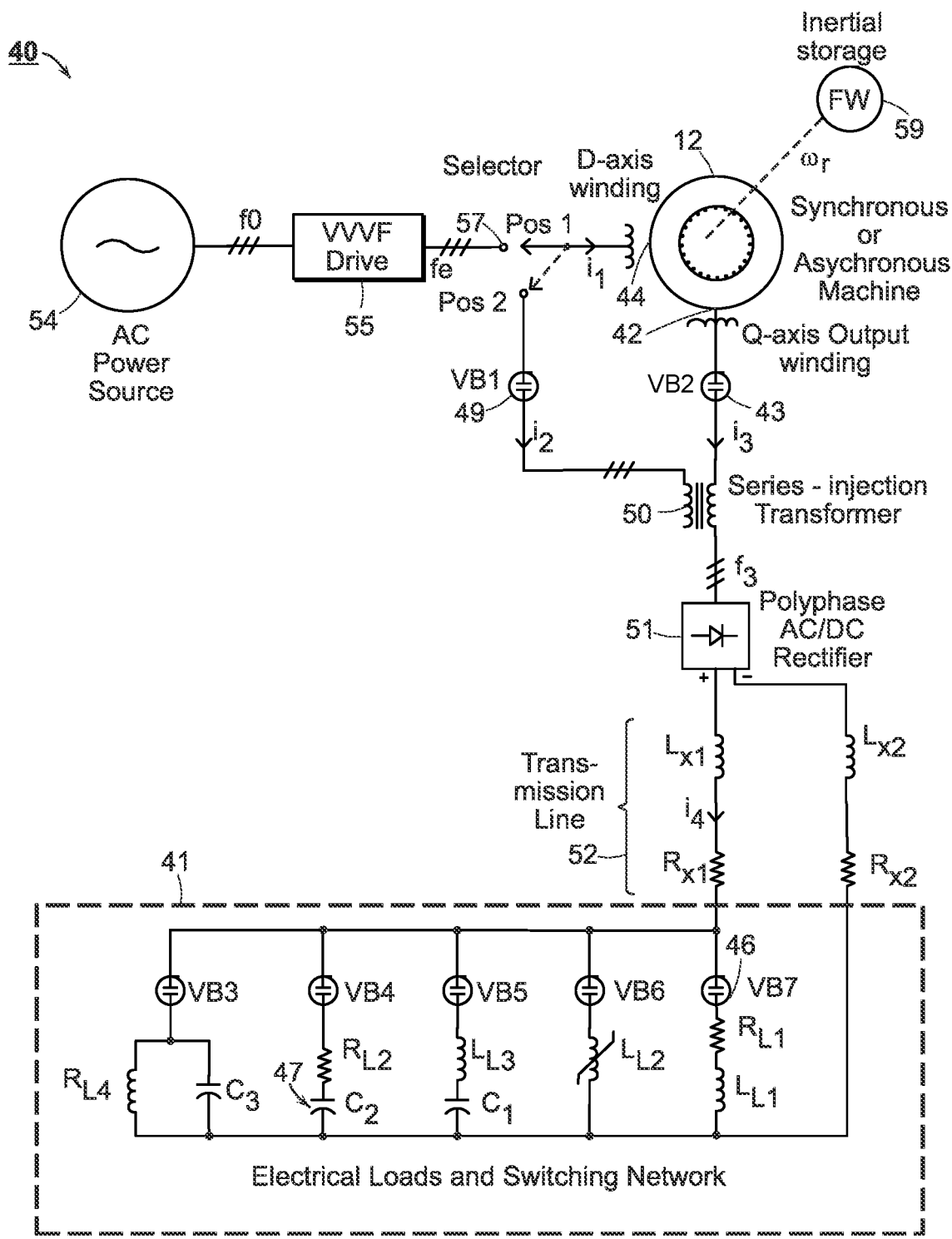
FIG. 4 is a circuit diagram of an example system that includes an induction machine to boost voltage output to a load.

FIG. 4 is a diagram of an example system 40 that uses an induction machine 12, which may be of the type shown in FIG. 2, to provide pulsed power to a load 41. In a starting mode, the D-axis winding brings the machine rotor up to operating speed and hence the machine set has a specific amount of stored or inertial energy in its rotor. In the example of FIG. 4, the induction machine includes a dual function for the D-axis winding to provide boost power that is used for series injection into the main Q-axis winding output. In this example, two sets of stator assembly windings—the D-axis windings and the Q-axis windings described previously—are controlled by either electromechanical switchgears or electronic switching networks to produce the output shown in FIG. 3C. In system 40, load 41 includes a multi-stage pulse forming network (PFN) which has its own energy storage capacity and also serves to sharpen the pulse output. The PFN includes load switches VB3-VB7 46, which may include electronic switches such as IGBTs (insulated-gate bipolar transistors) or thyristors. If electromechanical devices are used, the switching devices may include air-blast circuit breakers due to high DC currents. The load may include additional circuitry 47, which may include one or more of the following: R-L (resistive-inductive) circuitry, R-C (resistive-capacitive) circuitry, L-C (inductive-capacitive circuitry), a non-linear inductive load, or an L-C tank circuit, for example.

In example system 40, Q-axis winding output 42 is routed through switch VB2 43, which may be implemented using a vacuum breaker or a solid-state polyphase switch such as a thyristor or an IGBT. In the example of FIG. 4, the D-axis winding output 44 is routed through switch VB1 49, which may be implemented using a vacuum breaker or a solid-state polyphase switch such as a thyristor or an IGBT. A series injection transformer 50 separates the induction machine 12 from a polyphase rectifier 51, a transmission line 52, and load 41. Transformer 50 is configured to receive, on its windings, current from the D-axis windings and from the Q-axis windings and to generate the boosted power output to the load based on the superimposed current from the D-axis windings onto current from the Q-axis windings.

AC source power 54 may include a polyphase source that provides power to a variable-voltage, variable-frequency (VVVF) drive 55. VVVF drive is configured to convert the received power to a higher frequency f1, which is routed through selector switch 57 at position 1 to the machine D-axis winding 44. Inertial storage unit 59 is configured to maintain energy input to the induction machine absent direct power input from the AC source. The energy capability of inertial storage unit 59 may be multiple times the output energy of each pulse, thereby providing a continuous stream of output pulses for an extended period of time. For example, inertial storage unit 59 may be configured to maintain energy/power input to the induction machine even with decreasing rotor speed as stored energy is depleted after direct power input from the AC source has been disconnected. Direct power may be disconnected after the rotor reaches a predefined or target upper speed. When a target lower speed is reached during discharge mode, the direct power input may be reapplied. Inertial storage unit 59 is also configured to maintain energy/power input to the induction machine while the D-axis windings are providing boost power as described herein when the machine is within target upper and lower speeds. Switches VB1 49 and VB2 43 are controlled, for example by an external controller (not shown), to output current and voltage pulses described above from the D-axis windings and Q-axis windings, respectively. Polyphase rectifier 51 rectifies superimposed current and voltage from AC to DC and provides the resulting rectified output to the load 41 through transmission line 52.

Figure 5:
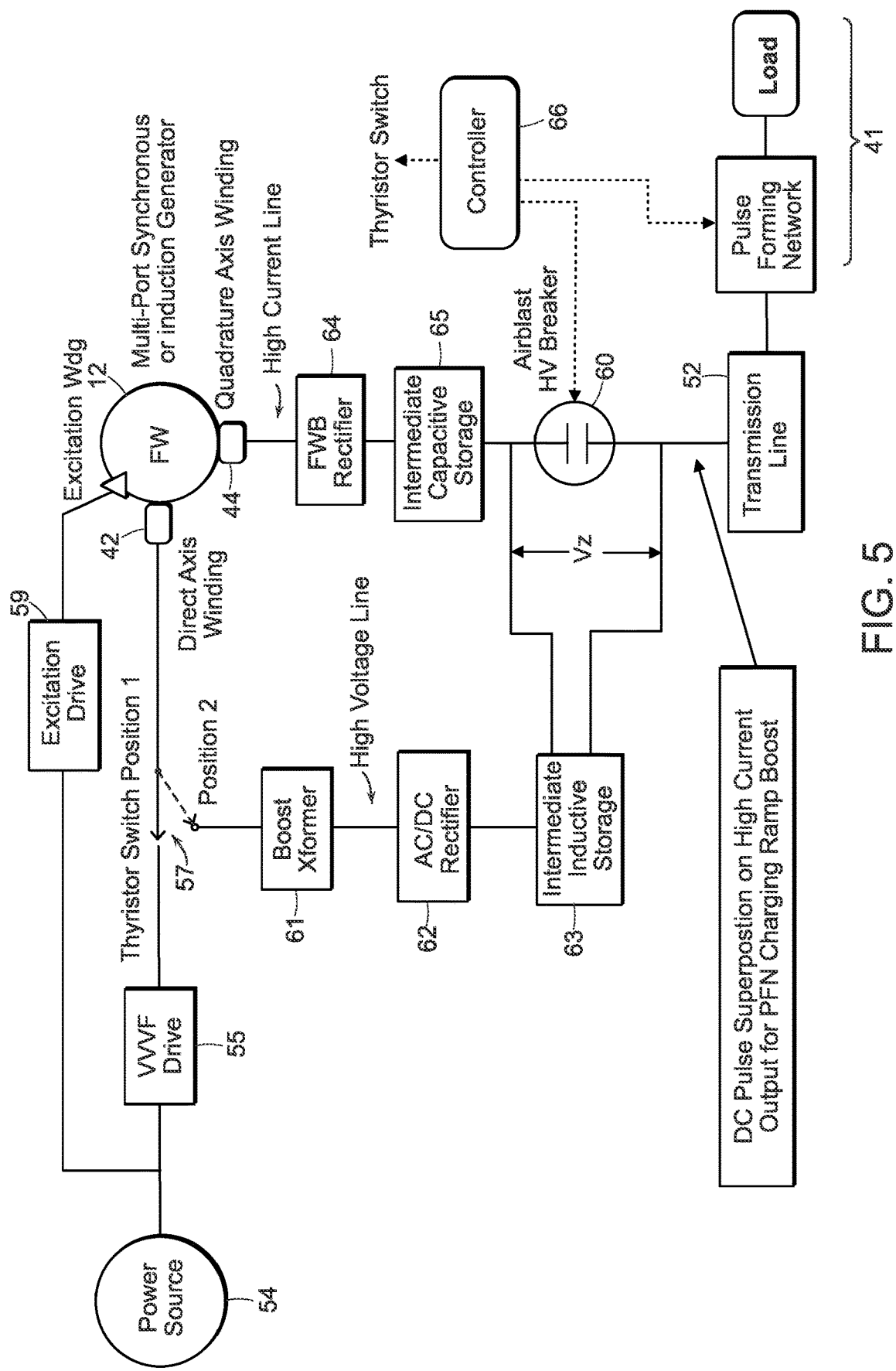
FIG. 5 is a block diagram of another example system that includes an induction machine to boost voltage output to a load.

FIG. 5 shows an example system having components in common with system 40. Elements labeled with the same references in the figures may have at least some or all of the same structure and function. In the example of FIG. 5, an airblast breaker 60 is used to control output of the superimposed voltage (Vz) and current from the D-axis windings onto the voltage and current output from the Q-axis windings. The current from the D-axis windings passes through a boost transformer ("Xformer") 61, an AC/DC rectifier 62, and intermediate inductive storage 63. The voltage from the Q-axis windings passes through a full-wave bridge (FWB) rectifier 64 and is stored in intermediate capacitive storage 65. Airblast breaker 60 is controllable by external controller 66 to combine the voltage output Vz across inductive storage 63 with the voltage at capacitive 65 to produce the superimposed boost output to the load described above. The voltage Vz is a transient voltage, with preferably a sharp rise time, which only results from the opening of airblast breaker 60. Excitation drive 59 provides variable-voltage variable-frequency power and drives operation of the rotor in induction machine 12.

Figure 6:
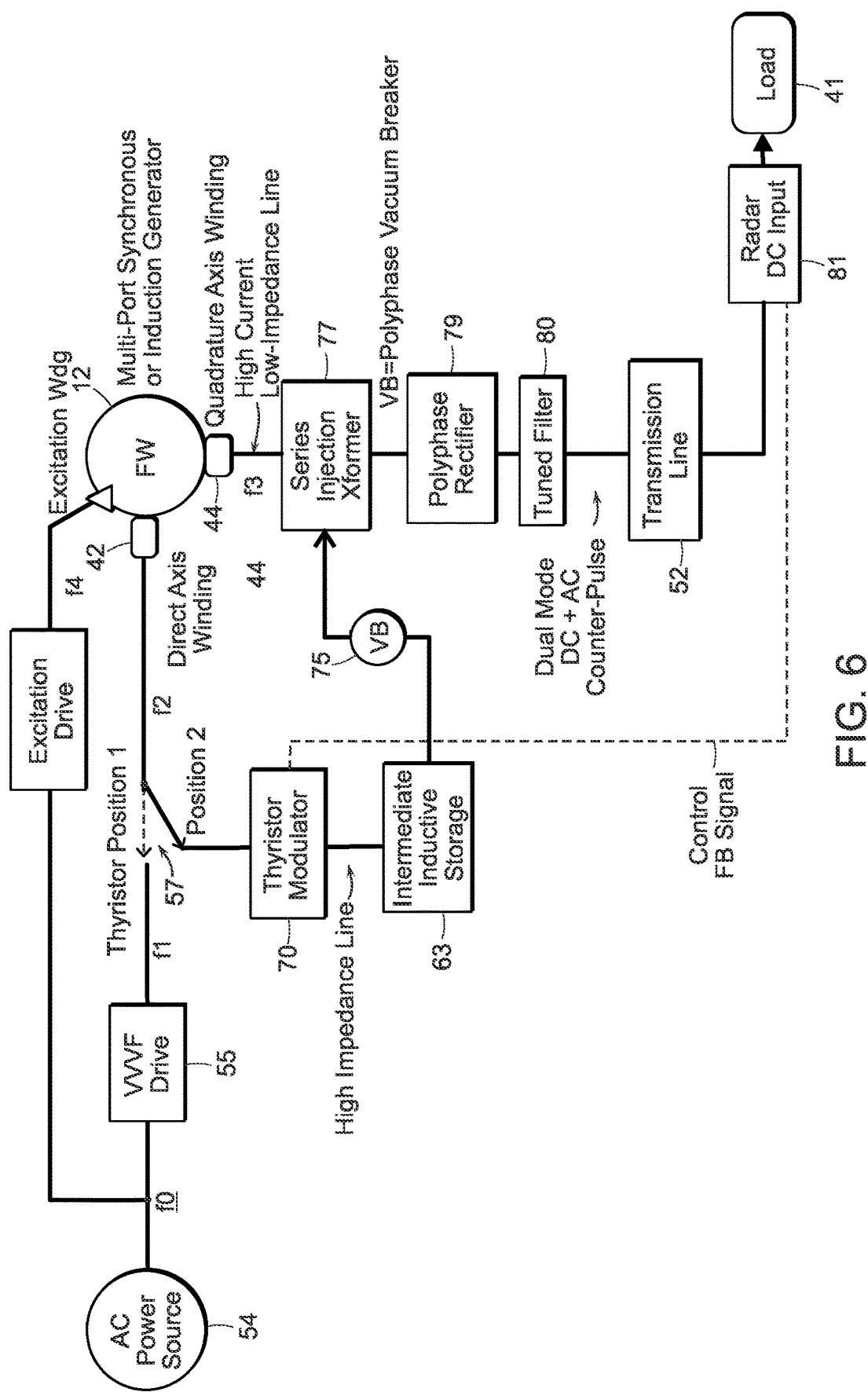
FIG. 6 is a block diagram of another example system that includes an induction machine to boost voltage output to a load.
Figure 7:
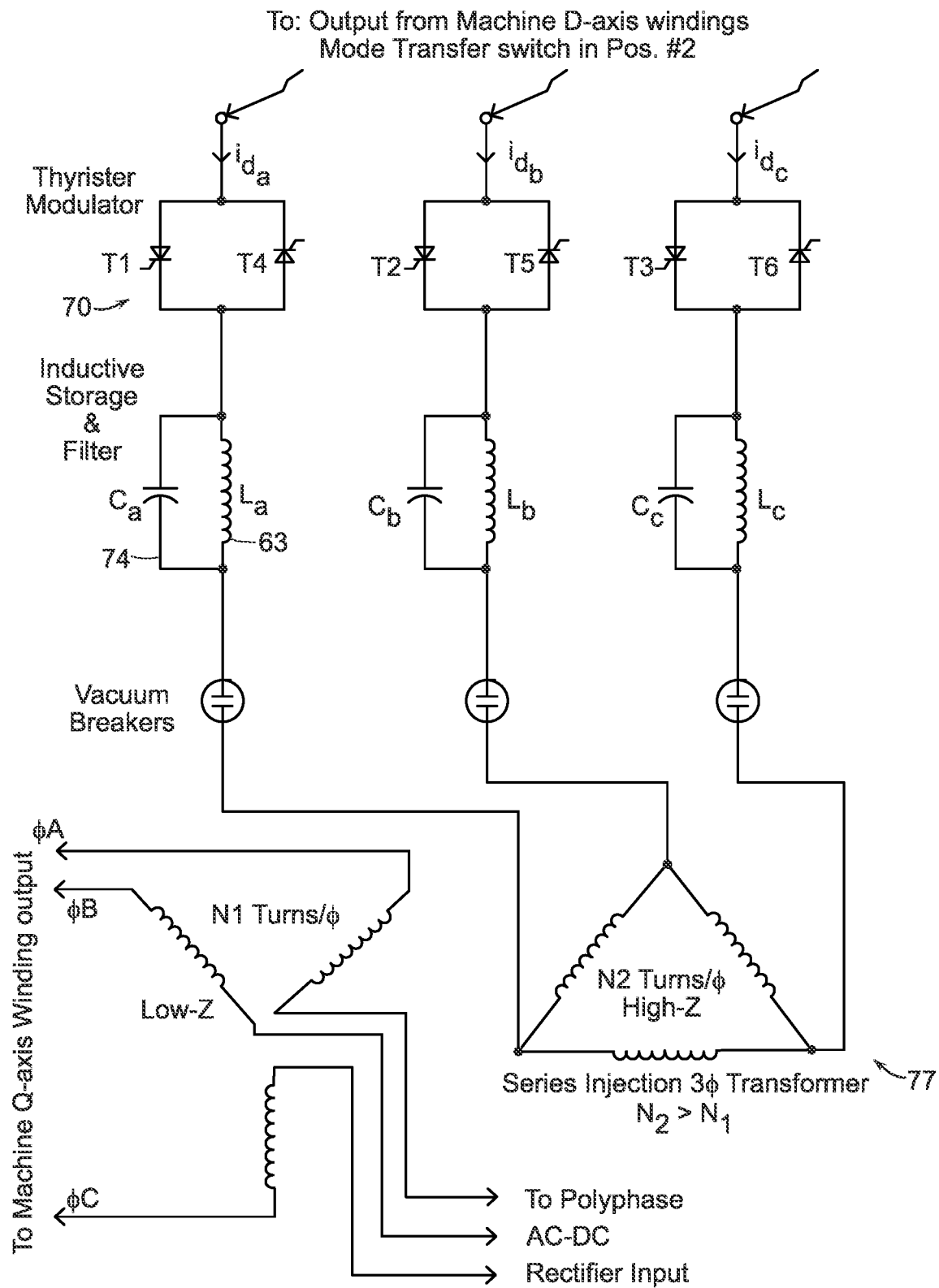
FIG. 7 is a circuit diagram of an example series injection transformer, filter, and thyristor modulator that may be used in one or more of the systems described herein.

FIG. 6 shows an example system having components in common with the system of FIG. 5. In the system of FIG. 6, a thyristor modulator 70 is connected to the D-axis windings output 42 along with intermediate inductive storage 63. FIG. 7 shows details of an example six (6) device thyristor modulator 70, intermediate inductive storage 63, and combined L-C filter circuit 74 that may be used along the output of the D-axis windings. In this example, the output of the D-axis windings is output along switch 57 in position 2 and then to thyristor modulator 70 having thyristor switches T1-T6, to inductive storage 63, to vacuum breakers (VB) 75, and to high impedance windings of a series injection transformer 77 which is shown as a delta to wye combination in FIG. 7. The intermediate inductive storage 63 also serves as a series L-C tank filter that can be tuned to a harmonic such as 180 Hz (Hertz) to increase impedance at this frequency. The machine inductance and transformer inductance may also enter into the resonant frequency for this L-C tank filter.

In the system of FIG. 6, the machine's D-axis windings may provide both real and reactive power to the input of a polyphase rectifier 79 if the voltage after transformation on the low impedance transformer winding is sufficiently high. The phase delay angle "alpha" of the thyristor modulator 70 partially controls the ratio between real and reactive power division. In the circuitry of FIG. 7, one machine winding (the Q-axis winding) provides the bulk of the output real power with a flywheel energy storage source yielding a continuous DC output. The second "motor" winding (the D-axis winding) functions as a modulating winding having the ability to provide either a programmed boost pulse to modify the tail or intermediate shape of the final output current or to provide extra reactive power. In some implementations, thyristor modulator 70 may include fast high-voltage solid-state switches and thus allow a superimposed wave to be implemented in a 10 to 100 microsecond (μs) response time on an output pulse. FIG. 6 also includes passive tuned harmonic filter 80 between the polyphase rectifier 79 and the transmission line 52 to provide dual-mode superimposed pulses to transmission line 52. In this implementation, a radar DC input 81 receives power from the transmission line for output to the load 41. Thyristor modulator 70 may be controlled based on the radar DC input to vary the boost power provided by the system as described below.

Systems that superimpose two or more power outputs onto a common load may require an insulation system for the current supply, which is able to survive high voltage potential and transients created by a high voltage supply. In the example induction machines described herein, the machine windings are electrically isolated by design and have relatively good voltage blocking capability due to heavy insulation between adjacent winding groups. In some implementations, induction machine 12 is a doubly-fed machine having a large variation—for example, greater than 10:1—in terminal impedance from D axis to Q axis parameters and a rapid rise in the D-axis winding voltage based upon a spatial shifting of magnetic flux.

Figure 8:
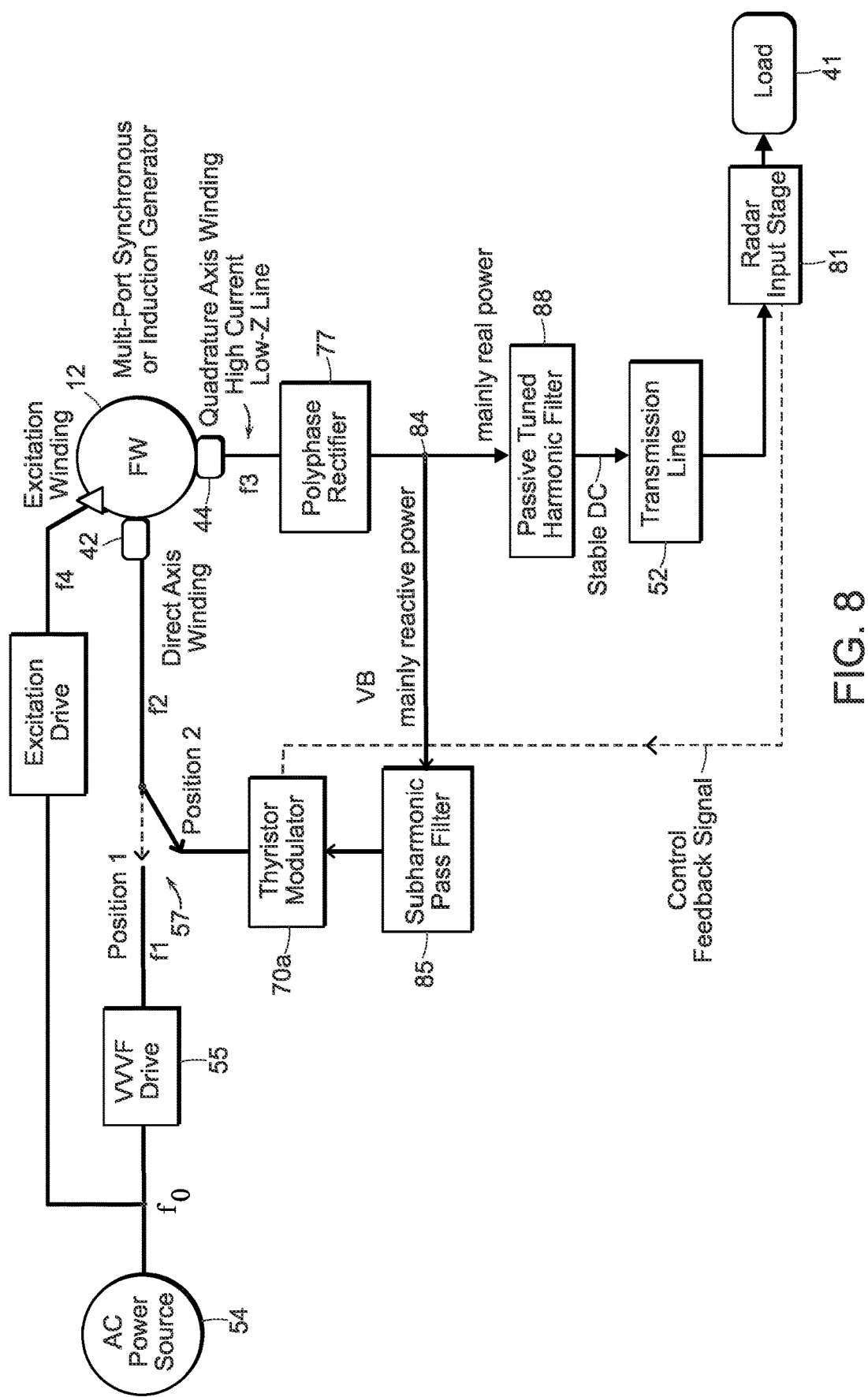
FIG. 8 is a block diagram of another example system that includes an induction machine to boost voltage output to a load.
Figure 9:
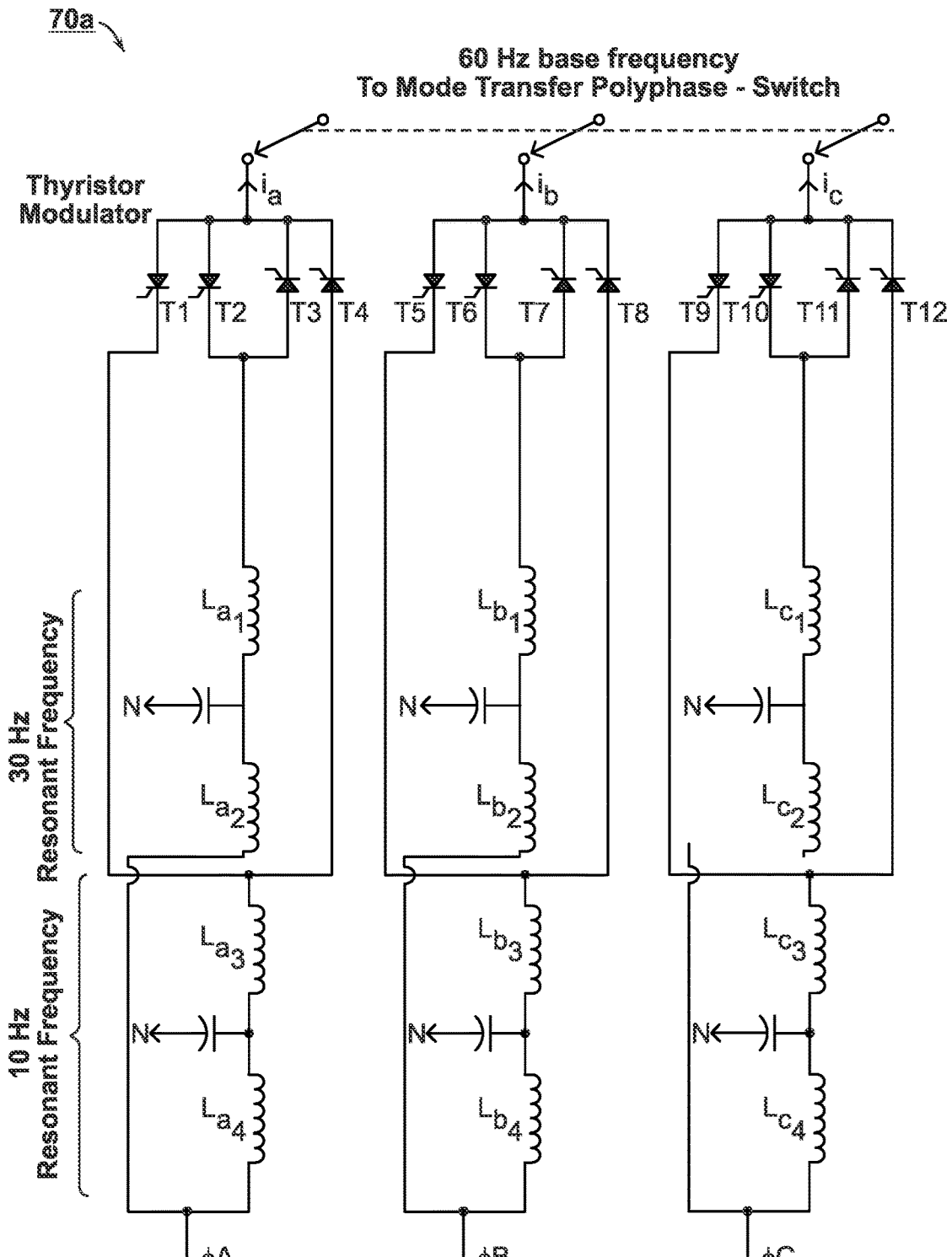
FIG. 9 is an example circuit diagram of a thyristor modulator that may be used in one or more of the systems described herein.

FIG. 8 shows a variation of the system of FIG. 6, in which low frequency or ripple sub-harmonics that are mainly reactive power are extracted from a main DC polyphaser rectifier output 84. The low frequency or ripple sub-harmonics are extracted, in this example, by a series of three current transformers that may be included in polyphase rectifier 77, that feed into two independent sets of subharmonic pass filters 85, and that are routed into the motor's D-axis windings by a polyphase thyristor modulator 70a through selector switch 57 in position 2. Polyphase thyristor modulator 70a is dual mode and configured to select one of two or more harmonic power filters and to provide specific harmonic energy back to the induction machine's D-axis windings once the induction machine is separated from a power grid input. In this example, when switch 57 is in position 2, the D-axis windings are fed sub-harmonic currents arising mainly from load current low-frequency pulsations in the range of 7 to 35 Hz for a 60 Hz system. FIG. 9 shows an example polyphase 12-device thyristor modulator 70a, which controls which L-C-L (inductive-capacitive-inductive) elements comprising filter 85 and also acts as bidirectional phase-angle controller to limit current. There can be more than two stages of independent filters, although two chosen frequencies may handle typical upper and lower limits of expected load pulsing. Output to the load is provided via a passive tuned harmonic filter 88 in FIG. 8, which provides a DC output.

Figure 10:
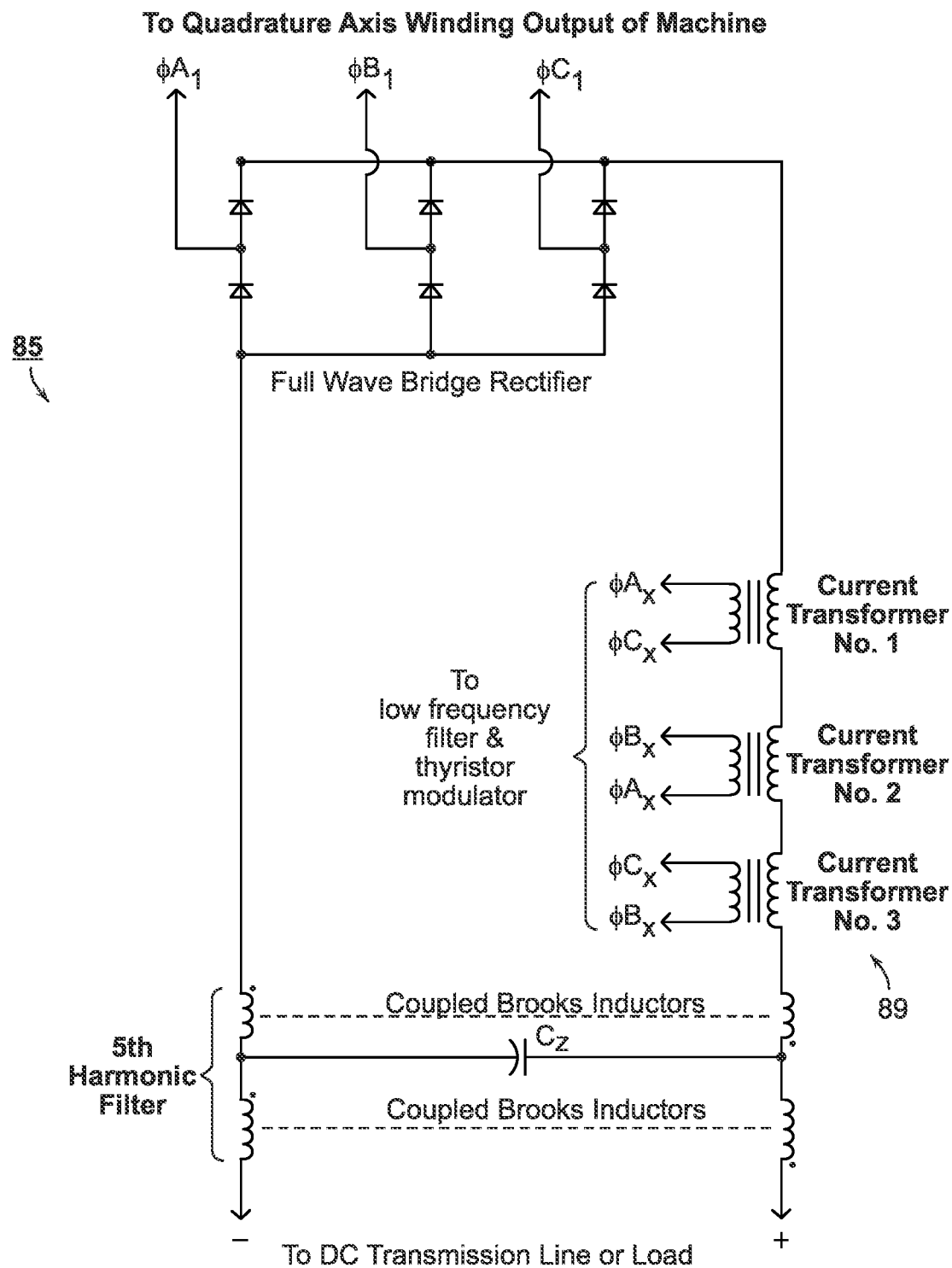
FIG. 10 is an example circuit diagram of a subharmonic pass filter that may be used in one or more of the systems described herein.

FIG. 10 shows an example circuit implementation of FIG. 8 at junction point 84. FIG. 10 shows secondary windings 89 designed as current transformers that are either routed through ⅛th of a base frequency-tuned L-C-L filter or ½ of a base frequency-tuned L-C-L filter. For example, if the base is 60 Hz, the first filter is a 10 Hz notch filter and the second filter is a 30 Hz notch filter. If the circuitry is used in a radar system, the filters may be used sequentially depending on what pulses the final load is creating. In the case of a radar system and referencing FIG. 9, thyristors T1 to T12 in thyristor modulator 70a receive a feedback signal from a radar input stage 81 (FIG. 8), which directs three pairs of thyristors to be gated ON. For example if the radar is pulsing at a 7 to 20 Hz rate, then the thyristors T1, T4, T5, T8, T9, T12 would be active and gating pairs at 120° apart. If the radar is pulsing at a 21 to 35 Hz rate, then thyristors T2, T3, T6, T7, T10, T11 would be active and gating pairs at 120° apart. Following current transformer input to the reactive power modulation circuitry of FIG. 8, if the machine output is 3-phase, the DC output will have a 5th harmonic filter that includes an L-C-L filter on each side of the output DC bus with the two inductor sets. These two inductor sets may be wound as a "Brooks coil" coupled inductor to increase inductance and allow for an air-core constructed filter. This produces relatively high impedance to the 5th harmonic, which can be the predominant harmonic in radar applications. If the machine output is a 6-phase, then the filter may be an 11th harmonic filter having the same arrangement of dual Brooks coil inductors.

Figure 11:
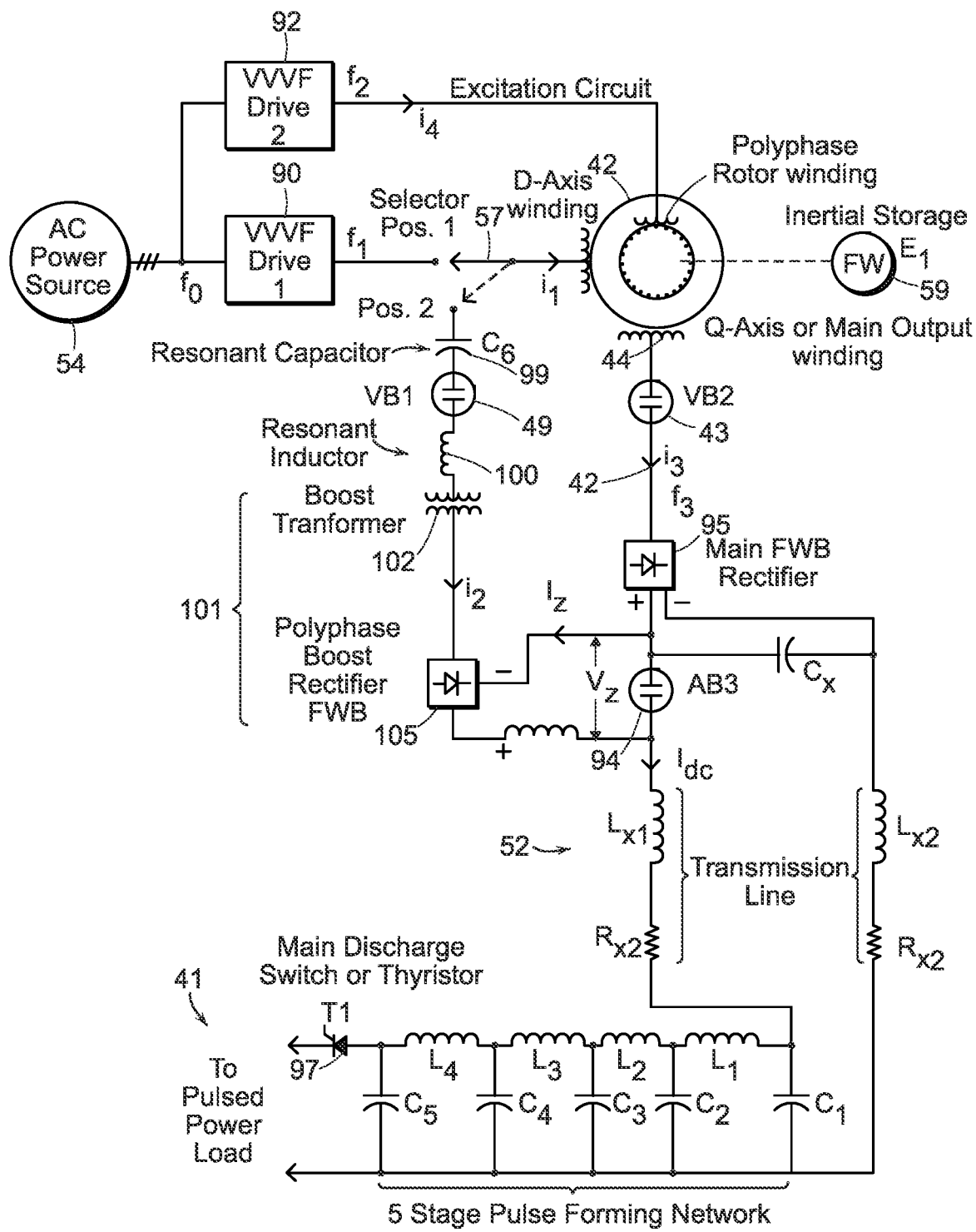
FIG. 11 is a circuit diagram of another example system that includes an induction machine to boost voltage output to a load.

FIG. 11 is an example system having components in common with the systems of FIGS. 4 and 5. In FIG. 11, the two sets of stator windings are controlled by either electromechanical switchgear or electronic switching networks. Source power is provided by a polyphaser AC power source 54 to VVVF drive 90 and is then converted to a higher frequency f1 routed to the machine D-axis windings through selector switch 57 in position 1. This D-axis windings bring the motor-flywheel speed from zero to full speed in a typical constant torque mode or constant V/Hz mode. Simultaneously, the induction machine's rotor is excited from a similar power source through VVVF drive 92 at variable frequency f2, which is linked in the control architecture to the shaft speed. Once the machine is up to full or near full shaft speed and the full energy level for the flywheel energy storage at level E1, the vacuum breaker VB2 43 and vacuum breaker AB3 94 are sequentially closed. These closures connect the Q-axis windings output 44 of current i3 at frequency f3 to a main rectifier 95 and hence to the transmission line 92 and to the load 41, which is an intermediate load in this example. When the capacitors C1 to C5 of the load (a PFN in this example) are charged up to full DC voltage value, a main thyristor switch T1 97 is closed and the PFN is discharged into a final electrical load (not shown). A multiple stage PFN may be configured to create nearly square wave output current, which may be desirable for many pulsed power applications. The PFN, when fired through T1, creates an output pulse that is substantially a square wave of voltage having a sharp rise-time, which may be desirable for some loads. The system is set-up for continuous fire or a continuous stream of output pulses by operating breakers VB2 and VB3 repetitively.

To enhance output characteristics, as the PFN is in the final process of being charged, vacuum breaker VB3 94 may be opened while switch 57 is placed into position 2. Vacuum breaker VB1 49 is closed, which is in series with the D-axis windings, a polyphase resonant capacitor C6 99, and polyphase resonant inductor 100. This configuration produces current i2 through boost transformer 100 into a boost rectifier bridge 101, thus creating DC transient current Iz and transient voltage Vz across the open contacts of AB3. The main rectifier 95 output diode blocks Vz from adversely affecting the Q-axis winding. The voltage Vz then appears across transmission line 52 and the input to load 41, yielding a boost or step voltage to the PFN input now in a final charge mode. Capacitor C6 99 forms a resonant circuit with the D-axis winding leakage inductance, which is typically non-linear, and inductance from inductor 100, which is typically linear. The leakage plus magnetizing inductance of the boost transformer causes the current through capacitor 99 to be a higher value than would be the case the case without the resonant circuit.

The circuitry of FIG. 11 includes a combination of two machine output ports—one for the D-axis windings and one for the Q-axis windings. Each port has a different time constant and a different transient power capability. In the current and voltage curves of FIGS. 3A to 3C, the Q-axis windings provide a relatively slow but high-current ramp to a load and, in the last time segment of current charging the load, the stepped boost pulse from the D-axis windings is delivered. The boost transformer 102 of FIG. 11 may include a polyphase unit and may be either a step-up or step-down transformer, which may be constructed using an air core winding to support fast discharge times. In an example, the boost transformer output (secondary) voltage is higher than the Q-axis winding AC output level. The circuitry thus superimposes power voltage on top of power current using two stator windings having different reactances and in different spatial axes.

The circuitry of FIG. 11 operates as follows. At a time T1, AC power source 54 provides input energy to both VVVF drives 90, 92. VVVF drive 92 is energized and ramps up rotor excitation current to the wound-rotor machine. Switch 57 is initially in position 1. At a next time T2, VVVF drive 90 operates to provide acceleration energy for the inertial storage unit and remains ON until the inertial energy storage is up to a rated energy level E1. Time T3 starts a "coast" period during which VVVF drive 90 is off and the inertial storage unit maintains speed/energy without direct power input from AC source 54. At a next time T4, vacuum breaker VB2 43 on the output of the Q-axis windings is closed, air breaker AB3 94 on the output of main rectifier 95 is closed sequentially, and switch 57 is repositioned to position 2. The transmission line and load are then charged by a DC voltage and current Idc. The output thyristor switch T1 97 is open. At a next time T5, the load terminal voltage, which has a time dependent charge, is sensed and when an intermediate threshold such as 90% of desired voltage is reached, the boost circuit is initiated. At a next time T6, vacuum breaker VB1 49 is closed and starts the D-axis current i2 circulating in a closed "short circuiting" loop that includes the D-axis neutralizing windings, FWB rectifier 105, and the Q-axis windings. At a next time T7, when i2 reaches a threshold value, breaker AB3 is opened. This creates a transient voltage Vz which is impressed directly across the breaker AB3 contacts and then is injected as a series-aiding voltage into the Q-axis DC output from main rectifier 95. This operation provides a super-position of two sources at high current i3 and a high voltage Vz. At a next time T8, the resulting summation voltage which is a composite of a slowly rising voltage and a stepped or peak voltage at the tail end of the charge cycle appears across both the transmission line and the PFN input. This summation voltage charges the series of shunt connected PFN capacitors C1-C5 and series inductors L1-L4. At end of time T8, VVVF 92 is turned OFF. At a next time T9, breaker VB2 43 is first opened and subsequently breaker VB1 49 is opened removing all load charging power. At a next time T10, the load 41 is discharged into a final electrical load by firing of thyristor or similar high current switch T1 97. At a next time T11, the discharge of the singular load or series of multiple loads is complete. After a rest period the next cycle is ready. At a next time T12, a repetitive cycle can start again by first changing selector switch 57 to position 1 and by powering up VVVF drive 92

Figure 12:
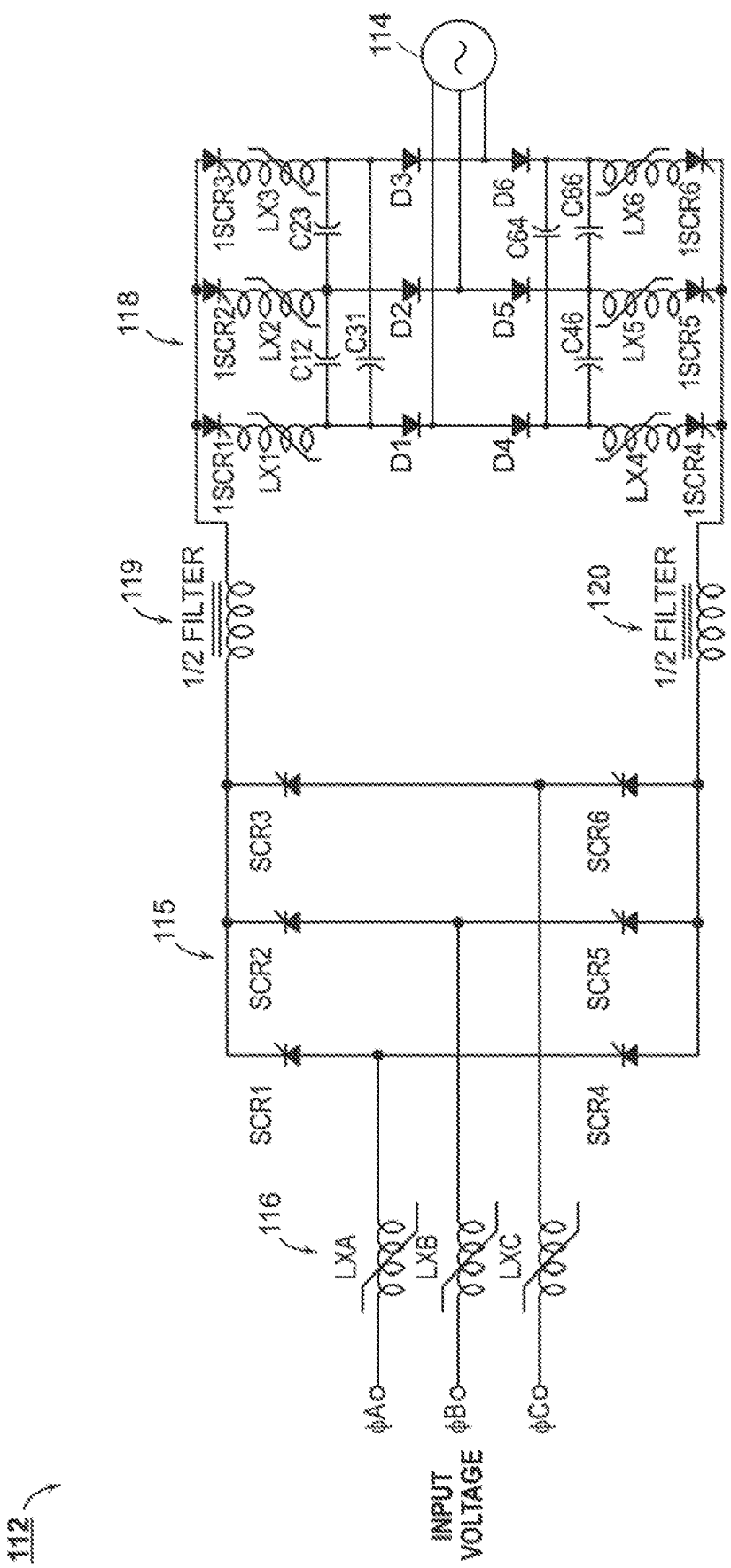
FIG. 12 is a circuit diagram of an example bi-directional VVVF rectifier inverter that may be used in one or more of the systems described herein.

FIG. 12 shows an example bi-directional VVVF rectifier inverter 112 drive that may be used the circuitry described herein. This VVVF type of drive feeds both the main D-axis windings and, in a separate and smaller rectifier-inverter unit, also feeds a rotor polyphase AC-excitation circuit (such as excitation drive 59 of FIG. 5) of a doubly-fed induction machine. The upper voltage level of the output is set by a rectifier and the frequency and final voltage may be established by an inverter stage. Component 114 represents either the primary/stator rotor winding or an induction machine.

Rectifier 115 may include a full-wave bridge (FWB) controlled rectifier having six thyristors for an "active" front end that includes three saturating input inductors (Lxa, Lxb, Lxc) 116 on all incoming phases. The inverter circuitry 118 includes an auto-sequential bridge inverter that includes six thyristors, six diodes, six commutation capacitors, and six saturating limiting reactors. DC bus filtering is performed by two balanced reactors 119, 120 and allows DC power flow to be bi-directional. The circuitry of FIG. 12 can be implemented using alternate switching devices such as IGBTs, IGCTs or MOSFETs. In operation, the circuitry of FIG. 12 enables real power from the D-axis windings to be fed back to the AC input line of the induction machine, if desired.

Figure 13:
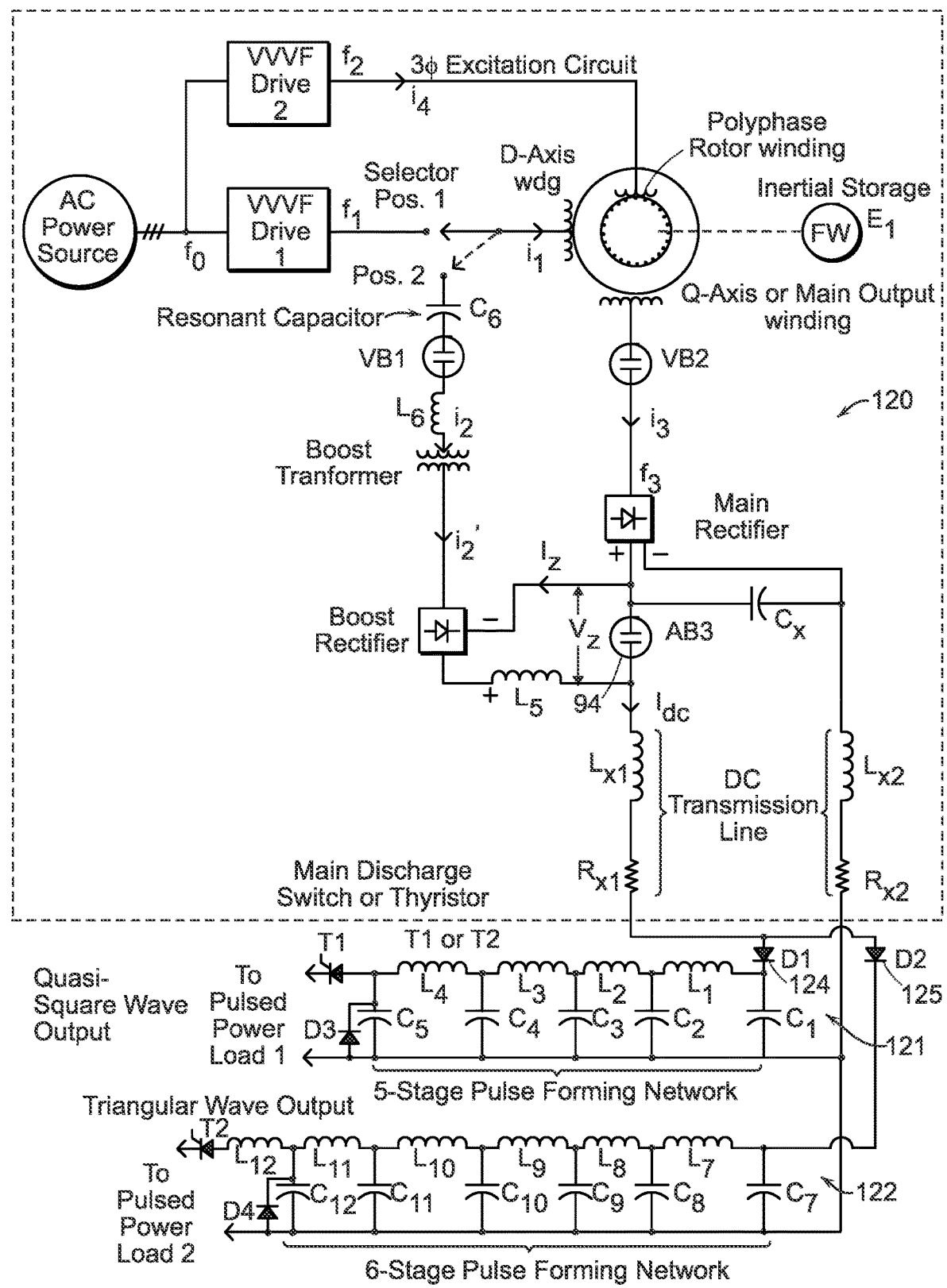
FIG. 13 is a circuit diagram of another example system that includes an induction machine to boost voltage output to a load.

FIG. 13 is a diagram showing a variant on the system of FIG. 11. In FIG. 13, the circuitry in block 120 is identical to the corresponding circuitry of FIG. 11. In the circuitry of FIG. 13, flux shift mechanisms are used to enhance output pulse generation in cases where two different types of output loads are powered and two different types of PFNs 121, 122 (which may be part of the output loads) use a common transmission line. An example first load 121 includes a PFN having a quasi-square output and an example second load 122 includes a PFN having a triangular or sawtooth wave output. Source power is provided by a polyphase source to a VVVF drive and is converted to a higher frequency f1 and routed to the D-axis windings through the switch in position 1. With the switch in position 1 and input power applied, the D-axis windings bring the machine-flywheel speed from zero to full or service speed (energy level E1) in a typical constant torque mode or constant V/Hz mode. Once the machine is up to designated speed and the energy level for the flywheel energy storage is at level E1, vacuum breaker VB2 is closed, which connects the Q-axis windings output at frequency f3 to the main rectifier and to a filter capacitor Cx and, therefore also, to loads 121, 122. In this example, intermediate loads include main air-blast circuit breaker AB3, transmission line (Lx, Rx), and two multi-stage PFNs 121 and 122. When the switch is moved to position 2, the system uses a resonant L-C circuit connected through breaker VB1 to the D-axis winding. The D-axis windings are no longer connected to the external power supply or power grid at this time. The D-axis winding output is now rectified by a boost rectifier and its output connected through inductor L5 forming DC current Iz, which is a high current or short-circuit level current. When breaker AB3 is controlled to open, a high boost voltage appears across AB3 contacts (or anode—cathode if a solid state switch is used), which aids in the basic output of the main rectifier voltage across capacitor Cx that is then is transferred to the system output enhancing magnitude of current Idc.

With current Idc flowing, capacitors C1-C6 in PFN 121 charge to their full DC voltage value, the main thyristor load switch T1 is closed, and PFN 121 is discharged into a final electrical load (not shown). With appropriate circuit parameters for C1-C5 and L1-L4, the PFN 121 output is a quasi-square wave, which may be desirable for some pulsed power applications. The multiple stage L-C circuitry of PFN 121 creates a pulse stream that is repetitively charged by induction machine 12 for repetitive pulse streams after each discharge cycle. The system may be configured for continuous fire or a continuous stream of output pulses by operating breaker AB3, which can be programmed to open and close repetitively. In second load circuit 122, which may be different from first load circuit 121, when capacitors C7-C12 and inductors L7-L12 in PFN 122 are charged to full DC current value, a final output thyristor switch T2 is closed and the PFN 122 is discharged into a final electrical load (not shown). With appropriate circuit parameters for C7-C12 and L7-L12, the PFN 122 output may be a sawtooth or triangular wave, which may be desirable for some pulsed power applications.

By appropriate application of isolation diodes D1 124 and D2 125, PFNs 121, 122 are able to share a common transmission line and common machine output circuitry 120, as shown in FIG. 13. In an example operating mode, T1 is operated and sequenced with T2 so that the two output thyristor switches alternate in conduction action.

Figure 14:
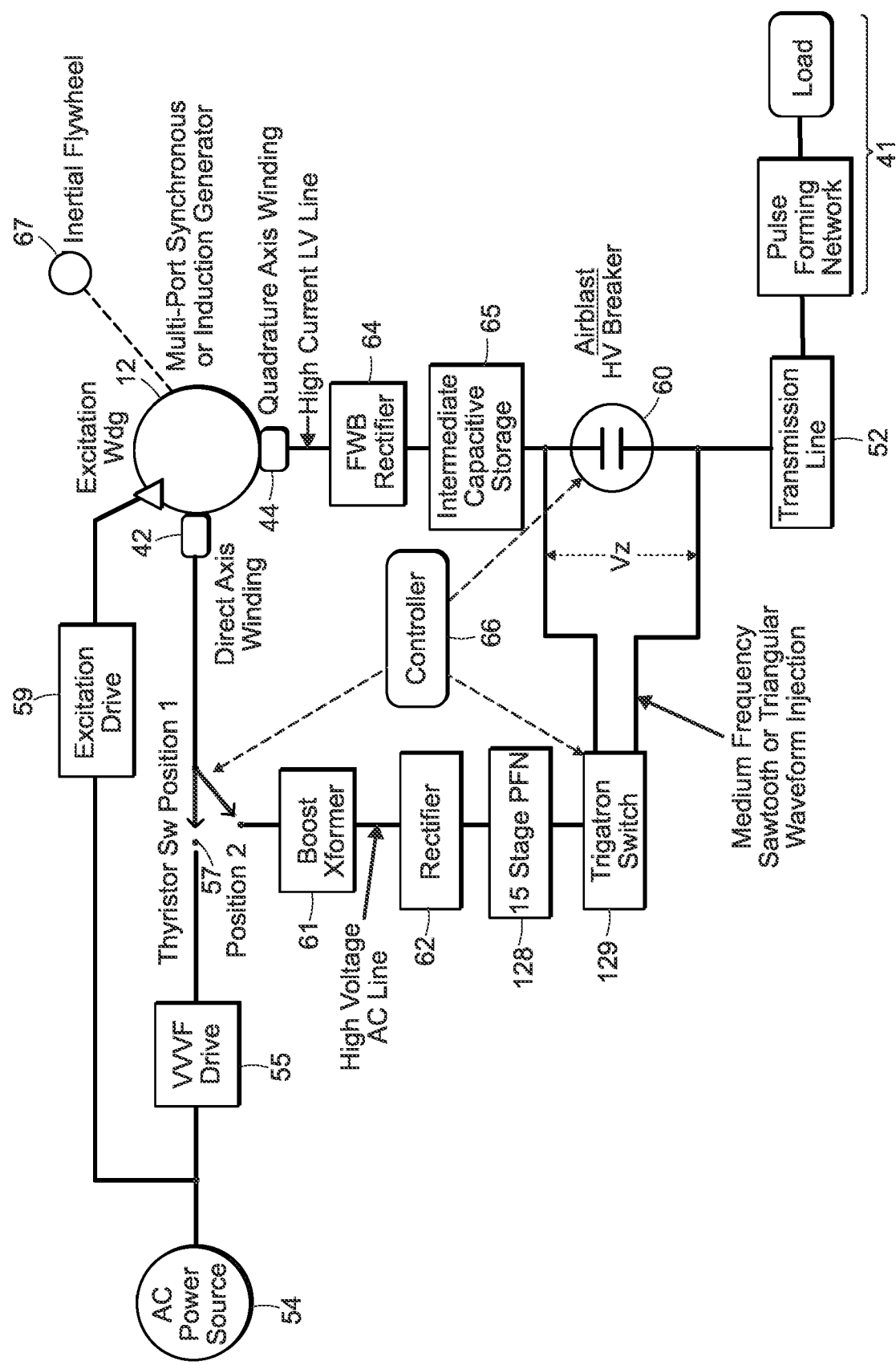
FIG. 14 is a block diagram of another example system that includes an induction machine to boost voltage output to a load.

FIG. 14 shows an example system having components in common with the system of FIG. 5. The system of FIG. 14 includes energy storage elements on the D-axis circuit output which include a fifteen-stage PFN and a boost transformer, and one capacitive storage element on the Q-axis circuit output. The outputs from both the D-axis circuit and the Q-axis circuit are rectified to DC when superimposed. In the system of FIG. 14, the exact timing of the injection of D-axis energy into the Q-axis energy is implemented by the combination of a trigatron switch 129 injecting energy into the Q-axis circuit when airblast breaker 60 opens. This creates a maximum transient or boost pulse into transmission line 52 and load 41. To this end, the system of FIG. 14 includes a polyphase voltage-boost transformer 61, full wave bridge rectifier 62, a high stage number—for example, a fifteen-stage—PFN 128, and the trigatron (triggered spark gap) switch 129 that includes a high voltage boost circuit but not a resonant circuit in this example. The trigatron switch 129 may be a spark gap switch having precise optical or laser triggering to implement a discharge of high voltage charge stored in a capacitor bank in the fifteen-stage PFN. Trigatron switch triggering may be timed to coordinate with the opening of airblast breaker 60 to allow optimum positioning of the boost pulse from the D-axis output onto Q-axis DC output from the intermediate capacitive storage 65. In this regard, the system of FIG. 14 includes three energy sources, namely PFN 128, capacitive storage 65, and a flywheel energy storage device 67, which is an inertial energy storage device that provides an energy input into the induction machine. During operation of the system, there is a transfer of kinetic energy from flywheel 67 to PFN 128 and capacitive storage 65 on a recurrent basis.

Figure 15:
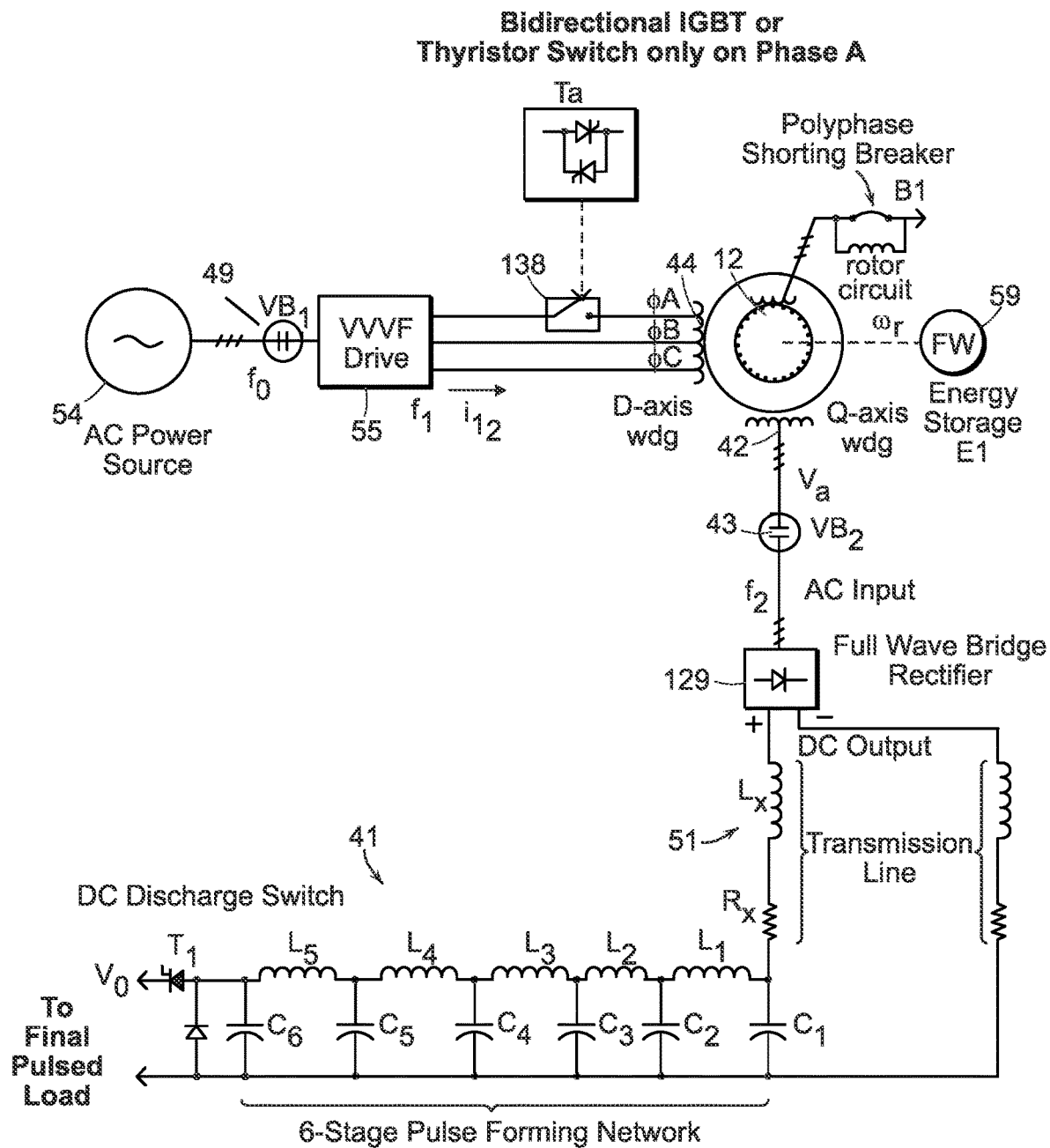
FIG. 15 is a circuit diagram of another example system that includes an induction machine to boost voltage output to a load.

The circuitry of FIG. 15 shows an alternate system having components in common with the system of FIG. 4 and specific to wound-rotor induction machines. The system of FIG. 15 is configured to generate, by magnetic induction, reoccurring sharp transients superimposed upon the machine output winding to aid in output pulse generation. The circuitry is configured to generate negative sequence primary currents in the D-axis winding output. A control system is configured to cause three of the following actions to happen sequentially once induction machine 12 is at target speed and/or inertial energy level. The D-axis excitation frequency, which is controlled by a VVVF drive, is periodically modulated above and below the half-synchronous speed point, since maximum transient high voltage generation in the D-axis occurs at plus or minus a few percent about the half-speed point. The induction machine's rotor circuit is purposely forced to have wide current excursions caused by shorting breaker B1 across an external rotor reactor/inductor bank. Alternately, the induction machine's rotor circuit is short-circuited if it is a wound-rotor machine. Transient voltages will be generated in the Q-axis output windings 42 on a controlled and periodic basis which are then rectified and transmitted to the load.

In an example implementation, once machine 12 is at half-speed, the D-axis winding input 44 is charged by an electromechanical switch 138, a thyristor, or an IGBT switching system from a polyphase power input/source but limited to a single-phase AC excitation (in other words, the polyphase input is periodically interrupted). This causes spatial-peripheral shifting of the D-axis winding airgap flux, a high negative-sequence current, and asymmetrical magnetic core flux. The net result is a reduction in input magnetizing reactance of the D-axis winding. This electromagnetic action causes a reduction in radial airgap flux over the D-axis stator slots and also causes flux shifting and increases in radially directed airgap flux over the Q-axis slots and windings in each pole, thereby boosting power output from the Q-axis windings. In some examples, the rotor windings may be partially short-circuited on the condition that one-phase is short-circuited through a low reactance/low resistance circuit and the other two phases are left open-circuit or have a high impedance load but not a short circuit. This also creates a negative-sequence rotating magnetic field, which may be desirable for creation of output pulses that require high bursts of machine energy.

Figure 16:
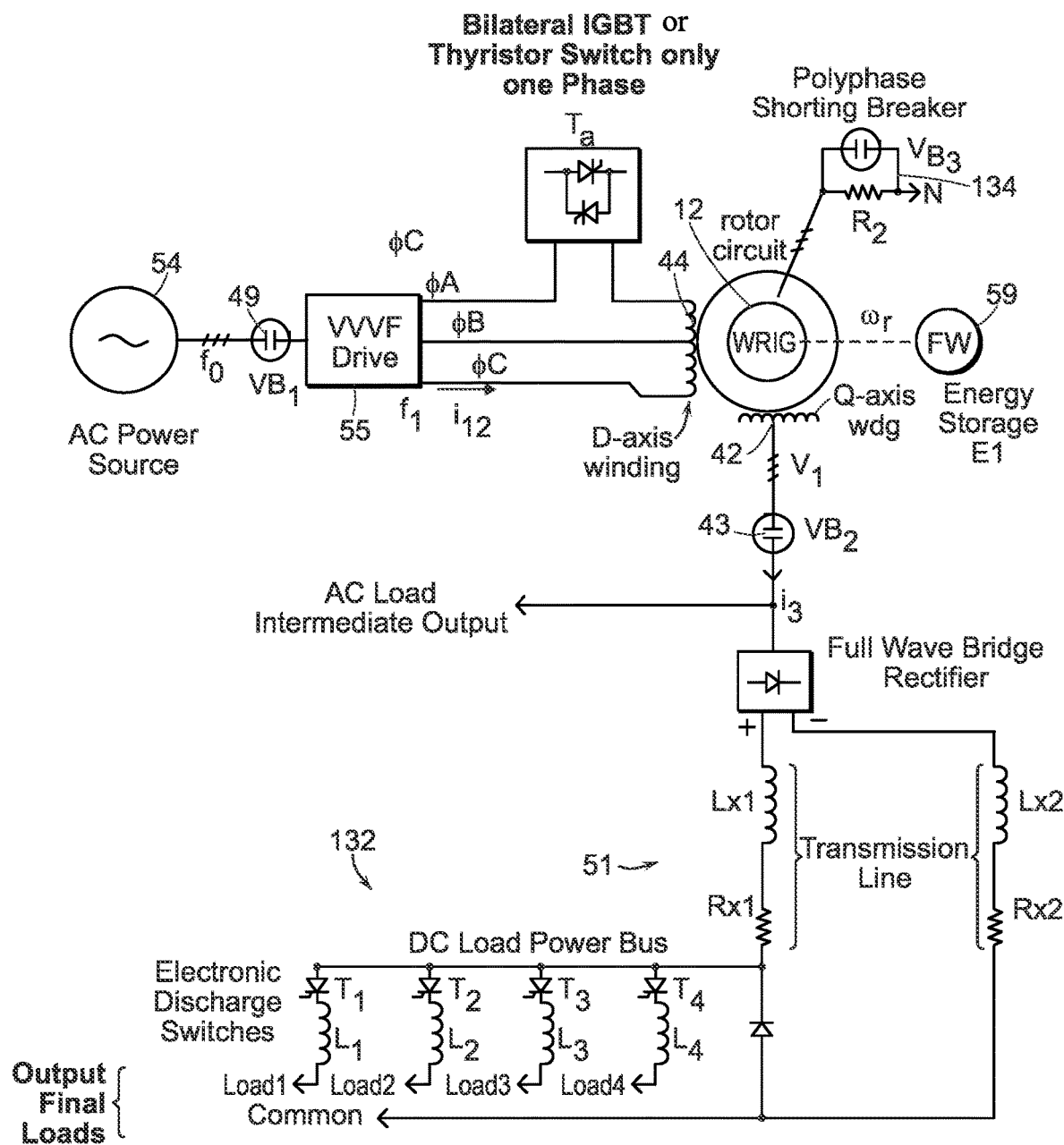
FIG. 16 is a circuit diagram of another example system that includes an induction machine to boost voltage output to a load.

FIG. 16 shows an example system having components in common with the system of FIG. 15 and having four independent loads, each controlled by separate electronic switches represented as thyristors T1-T4 132. Also, in this implementation, the induction machine rotor circuit is controlled by a polyphase resistance bank 134. This bank is short-circuited on a periodic basis by a circuit breaker or electronic switch, creates high negative sequence currents and uses an external controller to regulate high transient rotor currents and consequently boosted output repetitive pulse streams on the Q-axis windings.

Figure 17A:
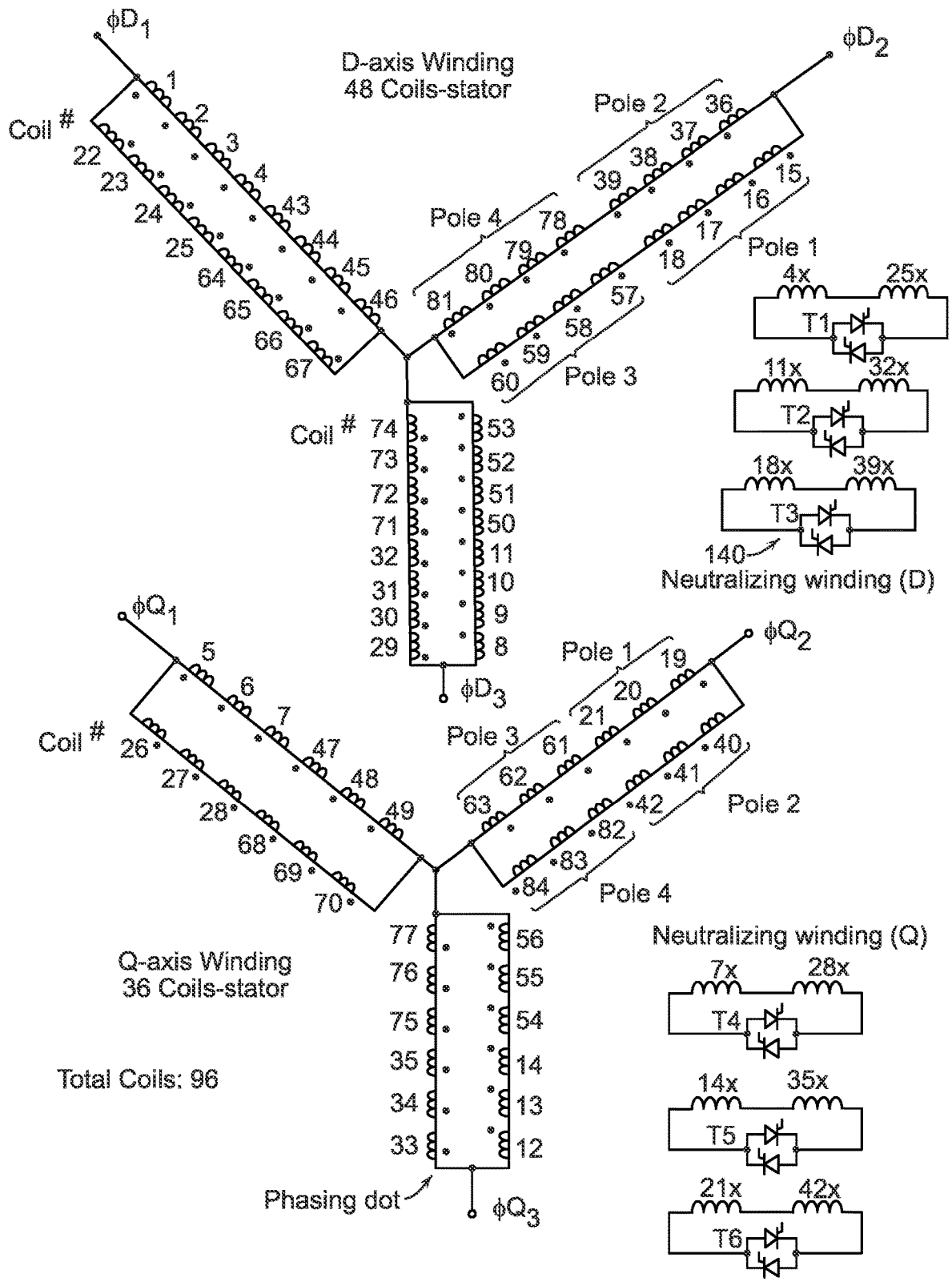
FIGS. 17A, 17B, and 17C are winding layout circuit diagrams for an example 4-pole induction machine.
Figure 17B:
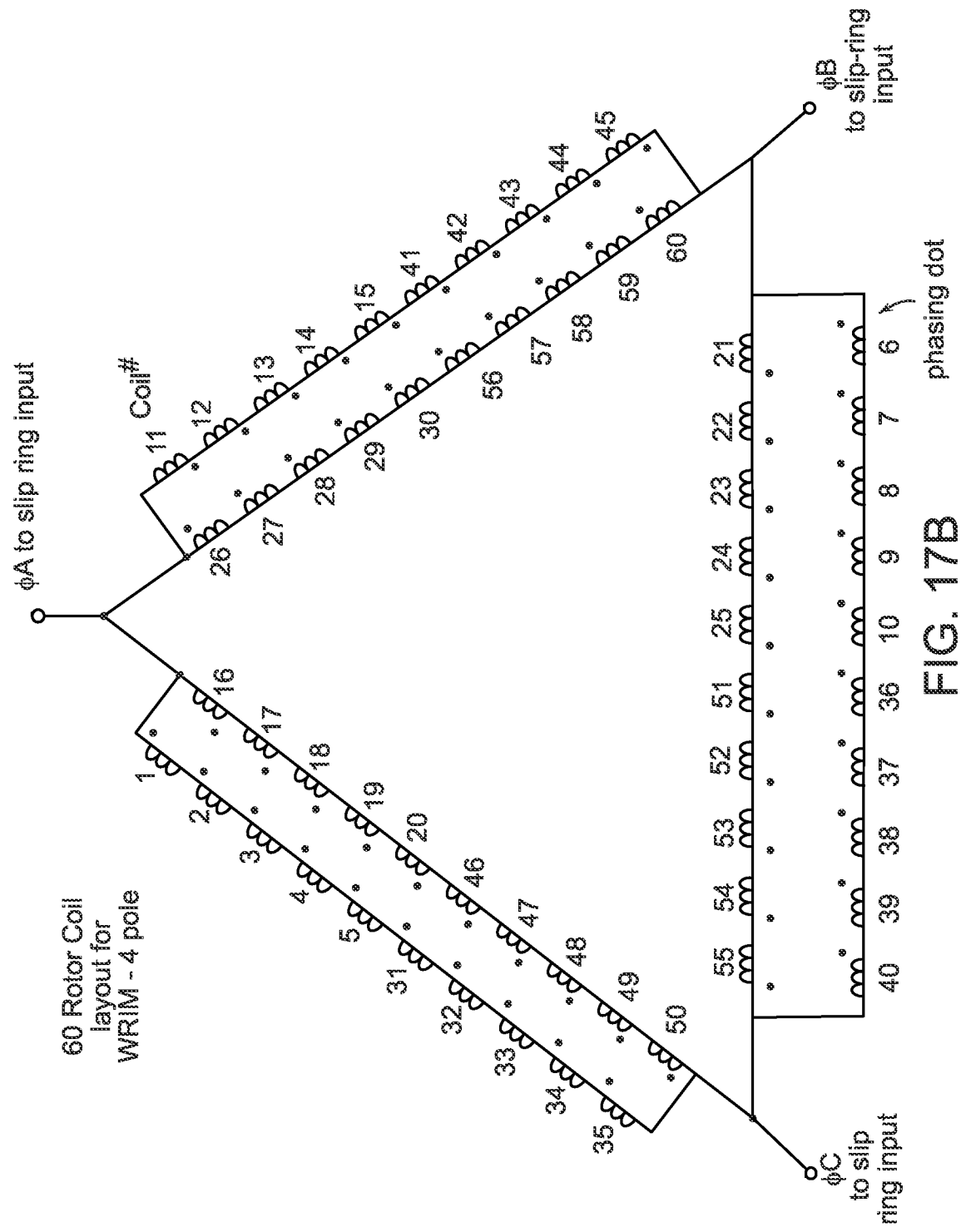
Figure 17C:
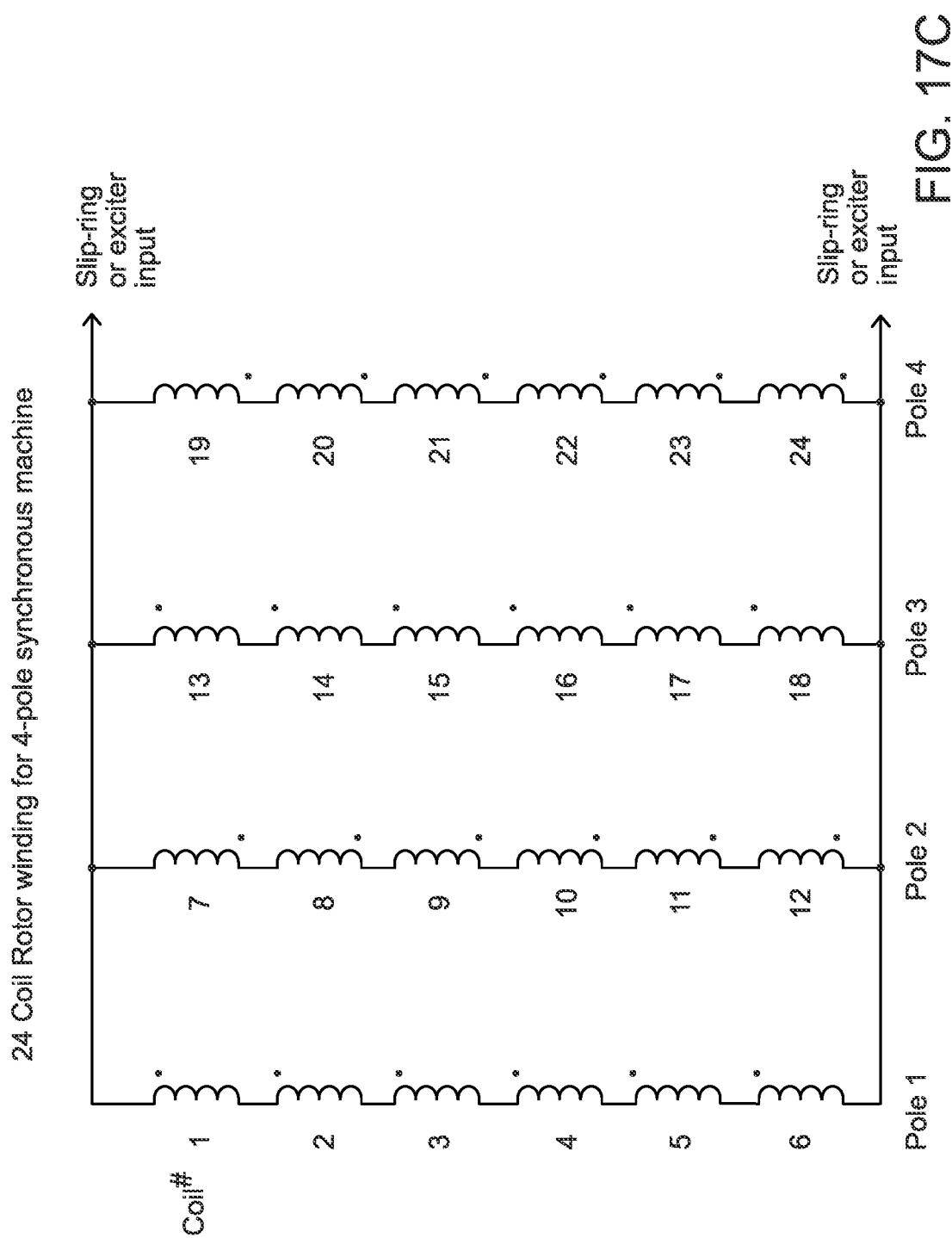

FIGS. 17a and 17b shows example winding layout diagrams for an example 4-pole machine, such as induction machine 12. This example includes D-axis 48 stator coils, Q-axis 36 stator coils, and neutralizing winding 12 coils, for a total of 96 stator coils in FIG. 17a. There may be 72 rotor coils in an example 4-pole induction machine in FIGS. 17b and 24 rotor coils if in an example 4-pole synchronous machine in FIG. 17c.

In this regard, there may be a set of neutralizing windings coils within the stator or primary frame, which may serve several electromagnetic purposes. In an example, interposed between or among each D-axis winding and the subsequent Q-axis winding (on a pole-by-pole basis) are a set of two or more isolated winding coils from diametrical opposite stator positions. These isolated windings are configured to reduce or to nullify the airgap radial flux in between these two sections. The current through these windings may be entirely controlled by a system of multiple bilateral thyristor switches that are under control of an external control system. The current through each set of series connected twin coils may be high. Furthermore, the ampere-turns of these coils may be close in magnitude to the ampere-turns of the D-axis windings. There are a total of six (6) sets of neutralizing coil pairs in the FIG. 17A example. An example diagrammatic layout of example neutralizing 135 coils is shown in FIG. 18.

In this regard, induction machine 137 of FIG. 18 shows the features of induction machine 12 along with neutralizing coils 135. Induction machine 137 may be used in any appropriate application, including in the examples described herein.

The neutralizing coils may be activated for intermittent use only and, in some examples, the neutralizing coils are only to be in service when making a transition from a motoring mode to a power generating mode or when a D-axis windings are being used as a boost winding to aid the Q-axis winding for pulse generation. The electromagnetic action of these, when spaced around the stator and within all phases, is to effectively segregate D-axis windings from Q-axis winding even though these two main windings are wound on a common primary core (the stator).

The neutralizing coils are also configured to shift the phase angle of the airgap flux at the boundary between the D-axis and Q-axis zones. In this regard, in some implementations, when the induction machine makes a transition from motoring mode to power generating mode and relies on the Q-axis windings for generating an output pulse, to produce maximum voltage output the airgap flux at the boundary condition, entering the Q axis zone at each pole should be in-phase with the intrinsic airgap flux generated by the rotor. The neutralizing coils may enable this airgap flux to be in phase alignment.

In this regard, when the machine is drawing power from an AC source, the polyphase input to D-axis windings may be interrupted on one phase as in the implementations of FIGS. 15 and 16. This causes a high negative sequence primary current in the D-axis windings. Simultaneously, the neutralizing windings may be switched into a closed short-circuiting loop. The closed short-circuiting loop induces a transient voltage in either Q-axis windings or the D-axis windings. This transient component may be used to augment the Q-axis winding output pulse energy or the rate of rise of voltage delivered to the load. Furthermore, the polyphase input to the D-axis windings may be connected as single-phase input to a boost transformer. This connection produces a high negative sequence primary current. Simultaneously, the set of neutralizing windings may be switched into a closed short-circuiting loop, which induces a transient voltage in both the Q-axis windings and the D-axis windings. This transient component may be used to augment the second Q-axis winding output pulse energy or the rate of rise of voltage delivered to the load.

In a wound-rotor slip-ring type induction machine, the rotor's external power circuit, which may be a resistive or inductive polyphase circuit, may be repetitively short-circuited causing a transient component in the rotor current. This transient component is reflected into the Q-axis windings as reoccurring and useful voltage and current transients. These transients may enhance (that is, boost) the output energy supplied by the Q-axis windings to the load on a recurrent or continuous basis.

In the example configuration of a 4-pole machine shown in FIG. 17A, a bilateral thyristor T1 controls coils 4X and 25X in series closed-loop connection, a bilateral thyristor T2 controls coils 11X and 32X in series closed-loop connection, a bilateral thyristor T3 controls coils 18X and 39X in series closed-loop connection, a bilateral thyristor T4 controls coils 7X and 28X in series closed-loop connection, a bilateral thyristor T5 controls coils 14X and 35X in series closed-loop connection, and a bilateral thyristor T6 controls coils 21X and 42X in series closed-loop connection.

Figure 19:
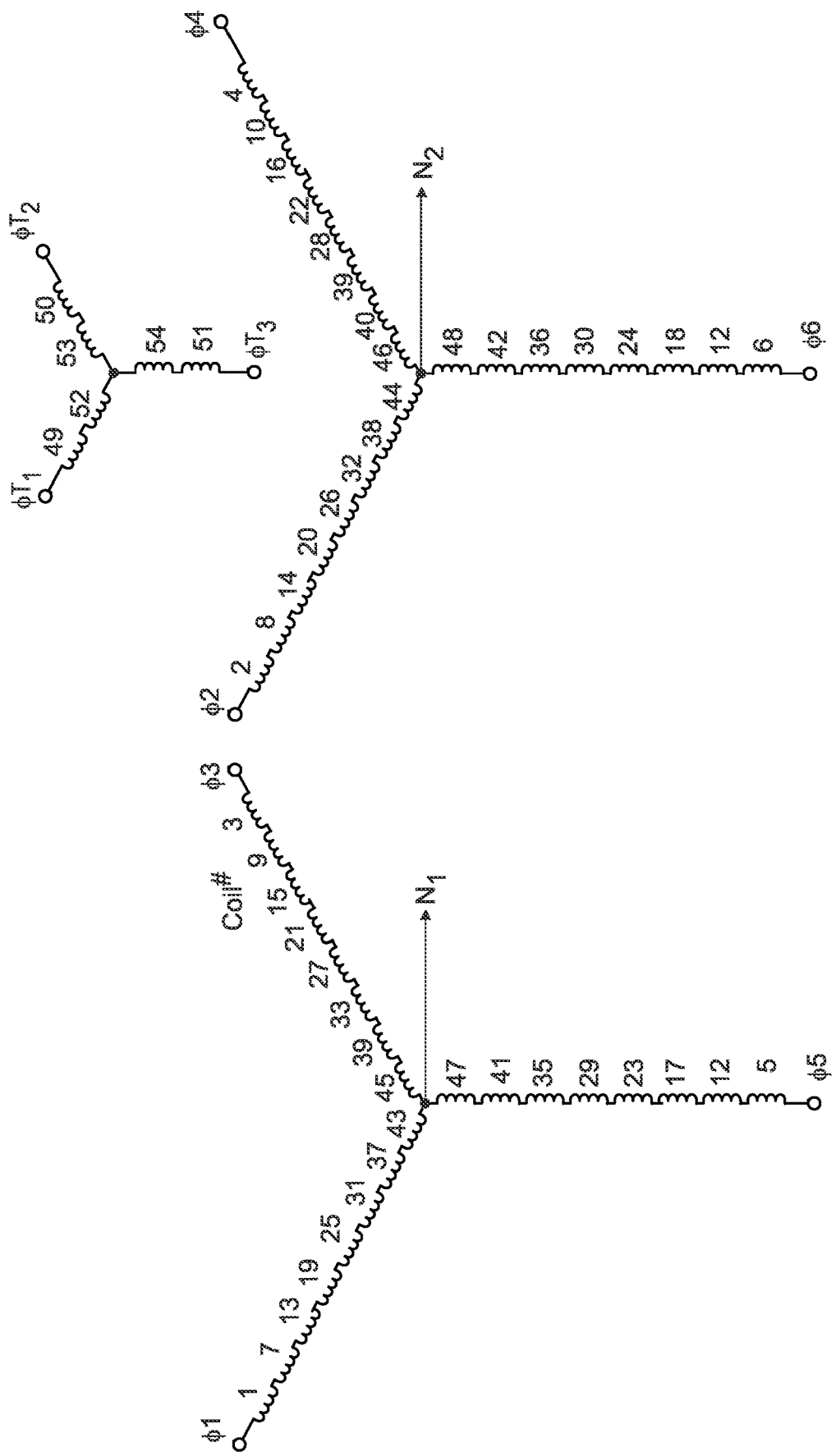
FIG. 19 is a winding diagram for an example 8-pole induction machine having three sets of polyphase stator windings.

FIG. 19 shows the coil configuration an example an 8-pole stator winding layout that may be used in the induction machines described herein. The layout includes three sets of polyphase stator windings in which the D-axis and Q-axis windings are equal in terms of number of coils (24) and peripheral arc along an airgap. There is also a set of six coils in a tertiary winding that can be short-circuited through a set of thyristors 140 as in FIG. 17A for a neutralizing winding or that can be separately excited by a polyphase power supply to assist with overall excitation of the machine. This type of winding can be applied to a cage-rotor induction machine in addition to a wound-rotor machine.

Table 1 provides design parameters of an example induction machine, e.g., and induction motor/generator of the type described herein. In this example, the radial airgap in the D-axis (motoring function) sector is sized at 0.025 inch and the Q-axis (generating function) radial airgap is sized at 0.100 inch; that is, there is a 4:1 difference in airgaps. This spatial dimensional change yields a clear difference in D-axis and Q-axis reactances of at least 4:1. The machine has 96 slots and 4 poles indicating 4 slots/pole/phase for the D-axis windings (48 coils total) and 3 slots/pole/phase of the Q-axis windings (36 coils total). The neutralizing winding of 12 coils arranged as 6 pairs of coils is included in the 96 slots. Each pole group is divided into two segments, since there are distinct D-axis and Q-axis winding areas in each pole. Both sets of windings are short-chorded and span 12 stator slots, resulting in a 50% chording. The Q-axis winding output reactance is calculated at 5.267 ohms and the D-axis input reactance is 31.6 ohms, indicating a reactance ratio of 6.00 by design of the machine magnetic circuit. This machine has basic 4:1 difference in airgap magnetic field stored energy based upon the airgaps chosen.

TABLE 1

1000 kW/1340 HP Cage Induction Machine

| | |
|---|---|
| Stator Poles | 4 |
| Stator Slots | 96 |
| Operating Speed Range | 5,000-10,000 rpm |
| Operating Electrical Frequency 166-333 Hz | 166-333 Hz |
| Rotor Diameter | 0.508 m (meters) |
| Active Length | 0.605 m |
| Stator Outer Diameter | 0.802 m |
| Stator Bores | Ds1 = 0.5093 m, Ds2 = 0.513 m |
| Radial Airgaps | 0.65 mm (millimeters) (input winding) and 2.5 mm (output winding) |
| Input Winding | 4160 Volts at 333 Hz, 3 phase, 76 Amps/phase in steady-state |
| Input Winding | 4 slots/pole/phase, double wye, 48 lap wound coils |
| Output Winding | 2080-4160 Volts, 3 phase, 228 Amps/phase in steady-state |
| Output Winding | 3 slots/pole/phase, double wye, 36 lap wound coils |
| Neutralizing Winding | 12 coils spaced every 30 degrees apart and connected 2 in series |
| Airgap Flux over D axes | 1.75 Tesla based upon constant value of input excitation |
| Airgap Flux over Q axes | variable from 0.50-1.90 Tesla |
| Q-axis Output Reactance | 5.267 ohms |
| D-axis Input Reactance | 31.6 ohms |
| Q-axis Output Power | 821 kVA to 1643 kVA |

An example implementation of machine 12 built according to the specifications of Table 1 includes a cylindrical-bore induction machine having periodic alternating and stepped variations in the stator bore, which then defines a spatially variable airgap and consequently a variable magnetizing reactance Xm as a function of peripheral angle. In this example, the airgap step change is at least 4:1 and the magnetizing reactance changes by a factor of at least 4:1 with the D-axis winding having the higher value of Xmd and Q-axis windings having the lower value of Xmq. The same physical layout of slots and airgaps also causes the stator leakage reactance X1d for the D-axis to be higher than the slot leakage reactance X1q for the Q-axis. In short $Xmd > Xmq$ and simultaneously $X1d > X1q$ In this example, the Q-axis windings are configured for use as an output winding and low reactance thereof is a design parameter which consequently yields a high output short-circuit current or high pulsed output current. Both Q-axis and D-axis windings share a common rotor or secondary electrical member in this example, which is either a cage rotor or a wound-rotor having a symmetrical slot layout and uniform rotor diameter. The rotor may be directly coupled to a flywheel or similar inertial energy storage rotating device or coupled through a speed changing gearbox.

The equivalent circuit parameters for the rotor leakage reactances X2d and X2q are also influenced by the overall airgap step-change geometry as such: X2d>X2q, which may be desirable to produce high output currents on the Q-axis winding.

In some implementations, in addition to enhancing magnitudes of output currents for a discharge mode, the new slot and airgap arrangement also results in the L/R time constant of the Q-axis circuit being lower than in the D-axis circuit, which may be advantageous for producing fast output pulses in string of power pulses.

Figure 20:
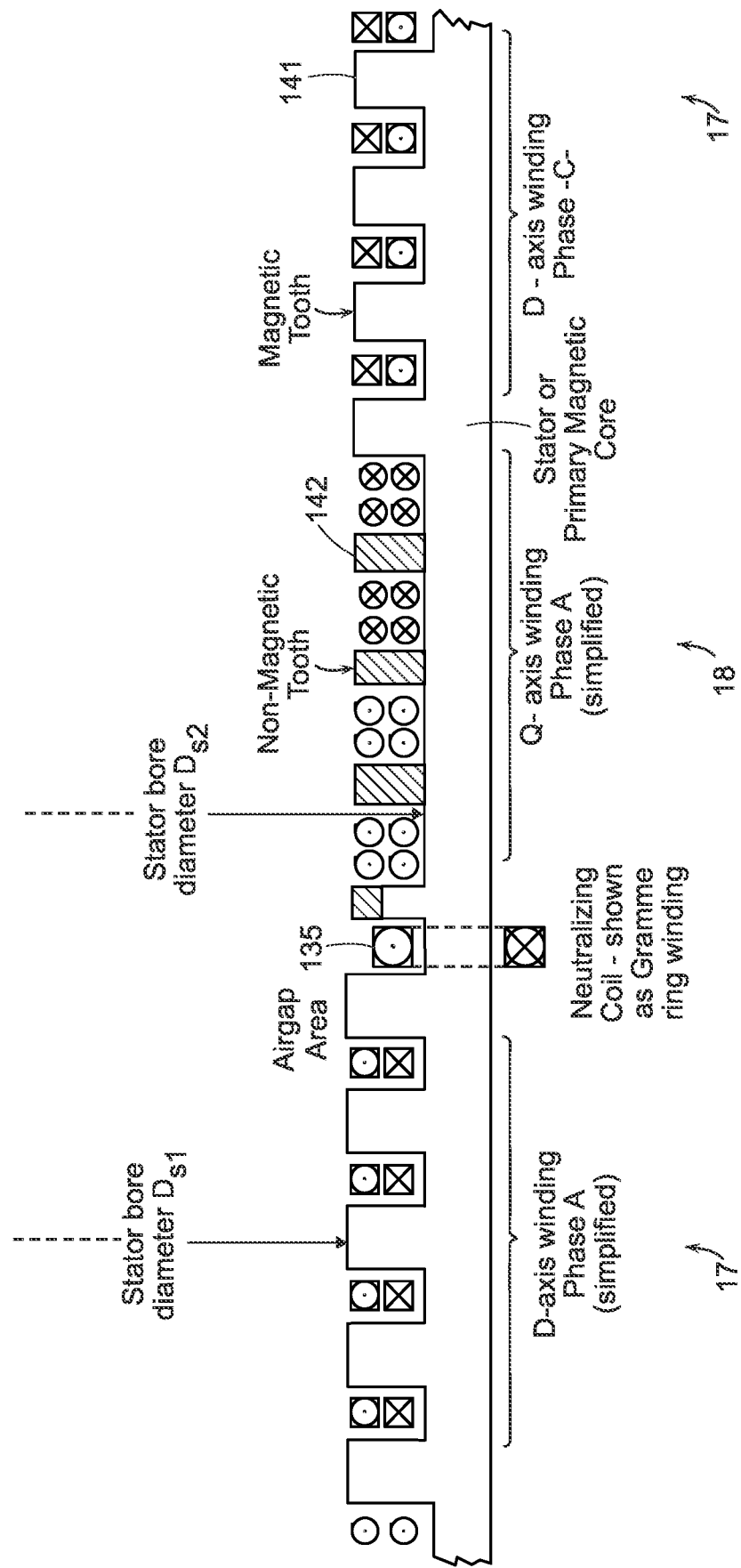
FIG. 20 is design layout diagram of an example stator for an induction machine having non-uniform airgaps between its stator and rotor bores.

FIG. 20 shows example stator or primary design layout. In some implementations, the Q-axis windings are constructed using non-magnetic teeth 142 over a peripheral zone of the Q-axis windings that do not provide for a low magnetic reluctance path on both sides of a stator coil. Conversely, the D-axis windings are held in place by ferromagnetic teeth 141 using slot wedges. In some implementations, the Q-axis windings are held in place against the magnetic core by non-magnetic structural teeth 142 such as fiberglass-epoxy material. This design feature may further reduce the stator slot leakage reactance X1q and enhance high current output performance. The neutralizing windings may be configured as singular (multi-turn or singular turn) wound coils surrounding the back of the machine magnetic core. This technique of winding layout is known as Gramme ring wound. Each neutralizing coil can be connected in series to a similar coil spaced diametrically part and controlled by an electronic switch to build-up current and MMF (magneto-motive force) when commanded to shift airgap flux in the direction of rotor rotation.

In this regard, referring also to FIG. 2, FIG. 20 shows an example first phase of D-axis windings 17, an example first phase of Q-axis windings 18, and an example second phase of D-axis windings 17 and neutralizing winding 136

The magnetizing Ampere-turns (AT) or MMF current for either D-axis or Q-axis windings may be calculated from the standard textbook formulas as $AT = 0.313 * Bg * G * k_s$ in Ampere-turns/pole, where Bg is the airgap radial flux density, G is the radial airgap dimension, and $k_s$ is the airgap coefficient accounting for slot openings or magnetic fringing effects on both sides of the airgap. The magnetizing current Im, which is inversely proportional to magnetizing reactance, may be calculated as $Im = 2.22 * P * AT / (m_s * N * f_w * f_c)$ Amperes where P is the number of primary poles, $m_s$ is the number of phases, N is the total number of series conductors in series per phase, fw is the winding distribution factor, and fc is the chording factor. If parameters of Bg, ks, P, ms, N, fw, fc are the same for the D and Q axis windings, a 4:1 increase in G will create a magnetizing current in the Q-axis windings that is four (4) times the magnetizing current of D-axis winding. In an example implementation, the Q-axis windings have N total series conductors per phase designed to be lower than the D-axis, e.g. N(Q) equals 0.25 N(Q). Then, with the combination airgap and turns change, the Q-axis magnetizing current and magnetizing reactance will become respectively $Im(Q) = 16$ times $Im(D)$ and consequently $Xm(Q) = 1/16^{th}$ of $Xm(D)$.

Any "electrical connection" as used herein may include a direct physical connection or a wired or wireless connection that includes or does not include intervening components but that nevertheless allows electrical signals to flow between connected components. Any "connection" involving electrical circuitry that allows signals to flow, unless stated otherwise, is an electrical connection and not necessarily a direct physical connection regardless of whether the word "electrical" is used to modify "connection".

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A system comprising a dynamo-electric machine, the dynamo-electric machine comprising:
    a rotor that is cylindrical and that is configured for rotation; and
    a stator that is arranged relative to the rotor, the stator having a stepped configuration that defines a first bore diameter for the stator and a second bore diameter for the stator, the first bore diameter being lesser than the second bore diameter, where zones of the stator at the first bore diameter hold direct-axis (D-axis) windings and where zones of the stator at the second bore diameter hold quadrature axis (Q-axis) windings, and where an airgap between the rotor and the Q-axis windings is greater than an airgap between the rotor and the D-axis windings, wherein the stator comprises neutralizing windings between or among sets of the D-axis windings and the Q-axis windings, the neutralizing windings being configured to change an airgap radial flux between adjacent D-axis windings and Q-axis windings.

2. The system of claim 1, further comprising:
    an inertial energy storage device to power the D-axis windings to enable the rotation when the rotor is disconnected from an external supply of power.

3. The system of claim 2, wherein the Q-axis windings are configured to output energy to a load;
    wherein the dynamo-electric machine is configured to power the D-axis windings through an external source until the rotor reaches a predefined speed, after which the D-axis windings are powered by the inertial energy storage device; and
    wherein, while the D-axis windings are powered by the inertial energy storage device, the dynamo-electric machine is configured to output energy from the D-axis windings that boosts the energy output by the Q-axis windings.

4. The system of claim 3, wherein the energy from the D-axis windings is superimposed on the energy output by the Q-axis windings.

5. The system of claim 3, wherein boosting the energy output by the Q-axis windings comprises at least one of adding current or voltage to current or voltage output by the D-axis windings.

6. The system of claim 3, wherein electrical reactance of the Q-axis windings is lower than electrical reactance of the D-axis windings based on differences in radial airgaps associated with the Q-axis windings and the D-axis windings.

7. The system of claim 3, wherein a combined energy from the Q-axis windings and the D-axis windings is pulsed.

8. The system of claim 3, wherein a combined energy from the Q-axis windings and the D-axis windings is continuous.

9. The system of claim 3, wherein a combined energy from the Q-axis windings and the D-axis windings is at an end of a rising power output of the Q-axis windings.

10. The system of claim 1, wherein the dynamo-electric machine is configured to output energy from the D-axis windings that boosts energy output to a load from the Q-axis windings; and
    wherein the system comprises a transformer between the dynamo-electric machine and the load, the transformer being configured to receive current from the D-axis windings and from the Q-axis windings and to generate boosted energy output to the load based on e current from the D-axis windings and from the Q-axis windings.

11. The system of claim 1, wherein the dynamo-electric machine is configured to output energy from the D-axis windings that boosts energy output to a load from the Q-axis windings; and
    wherein the dynamo-electric machine comprises:
    a switch that is controllable to interrupt a circuit between the dynamo-electric machine and the load, wherein interruption of the circuit coincides with injection of energy from the D-axis windings, the interruption producing transient voltage and transient current that boosts energy output from the Q-axis windings.

12. The system of claim 11, wherein the transient voltage and current increase a rate of rise of the energy output from the Q-axis windings.

13. The system of claim 11, wherein the transient voltage and current increase a total energy output to the load.

14. The system of claim 11, wherein the transient voltage and current produce a pulsed energy output to the load.

15. The system of claim 11, wherein the Q-axis windings, the switch, and the D-axis windings produce a current loop that is interrupted by controlled opening of the switch.

16. The system of claim 11, wherein output current from the D-axis windings circulates in a closed loop until the current reaches a target value at which time the switch is controllable to interrupt the circuit.

17. The system of claim 1, further comprising:
    circuitry to change the D-axis windings from a polyphase input to a single-phase alternative current (AC) excitation, thereby causing a spatial-peripheral shift in airgap flux of the D-axis windings and, as a result, boosting energy output by the Q-axis windings.

18. The system of claim 1, wherein the dynamo-electric machine is configured to output energy from the D-axis windings that boosts energy output to a load from the Q-axis windings; and
    wherein the system comprises:
    a rectifier to rectify a current component of the energy from AC (alternating current) to DC (direct current); and
    inductive storage to receive the current from the rectifier to boost the output energy from the Q-axis windings.

19. The system of claim 1, Wherein the dynamo-electric machine is configured to output energy from the D-axis windings that boosts energy output to a load from the Q-axis windings; and
    wherein the load comprises a pulse forming network (PFN) comprising inductive and capacitive components, the PFN for producing shaped pulses.

20. The system of claim 1, wherein the dynamo-electric machine is configured to output current from the D-axis windings that boosts energy output to a load from the Q-axis windings; and
   wherein the system comprises:
      a subharmonic filter to extract subharmonies from a rectifier along output of the Q-axis windings; and
      a thyristor modulator to feed the subharmonies into the D-axis windings upon separation of the induction machine from external power, the subharmonics comprising reactive power.

21. The system of claim 1, wherein the dynamo-electric machine is configured to output current from the D-axis windings that boosts energy output to a load from the Q-axis windings; and
   wherein the system comprises:
      a harmonic filter that forms a resonant circuit with the D-axis windings, the harmonic filter being connected to an output current port from the D-axis windings;
      a boost transformer in series with the harmonic filter to receive the current from the harmonic filter and to boost the current; and
      a polyphaser rectifier to receive the boosted current and to provide a rectified output based on the boosted current to boost the energy output to the load.

22. The system of claim 1, wherein the dynamo-electric machine is configured to output current from the D-axis windings that boosts energy output to a load from the Q-axis windings; and
   wherein the system comprises:
      a boost transformer along an output of the D-axis windings to receive current from the D-axis windings;
      a rectifier to rectify an output of the boost transformer;
      a pulse forming network comprising storage elements that charge based a rectified output from the pulse forming network; and
      a switch that is triggerable to output energy from the pulse forming network to combine with the energy output from the Q-axis windings.

23. The system of claim 22, wherein the switch comprises a spark gap switch; and
   wherein the system comprises:
   capacitive storage to store the energy output from the Q-axis windings; and
   an inertial storage device that transfers energy with the capacitive storage and the pulse forming network during operation of the induction machine.

24. The system of claim 1, wherein the D-axis windings are configured to receive a polyphase input;
   wherein interruption of the polyphase input produces negative sequence primary current in the D-axis windings; and
   wherein the system further comprises neutralizing windings that are switchable into a closed short-circuiting loop that induces transient voltage in the D-axis windings or the Q-axis windings, the negative sequence primary current producing the transient voltage boosting output voltage to a load from the Q-axis windings.

25. The system of claim 1, wherein the induction machine comprises a polyphase wound rotor of the induction machine configured to receive a polyphase input;
   wherein a change in magnitude or phase displacement of the polyphase input produces negative sequence primary current in the D-axis windings; and
   wherein the system further comprises neutralizing windings that are switchable into a closed short-circuiting loop that induces transient voltages in the D-axis windings and the Q-axis windings, the transient voltages initiated by the rotor induction machine creating a boost in output voltage to a load from the Q-axis windings.

26. The system of claim 1, further comprising:
   a polyphase source to provide excitation to the D-axis windings, the polyphase source being controllable to provide pulsed single-phase excitation to the D-axis windings;
   wherein a change in excitation to the D-axis windings from polyphase to single-phase causes a negative sequence current through the D-axis windings that results in a flux compression effect within a magnetic field of the airgap between the rotor and the Q-axis windings and the airgap between the rotor and the D-axis windings, the flux compression changing effective impedance associated with the D-axis windings and Q-axis windings.

27. The system of claim 1, wherein the Q-axis windings are configured to output energy a load, the load comprising a pulse forming network and a radar system.

28. The system of claim 1, wherein the dynamo-electric machine is configured to output current from the D-axis windings that boosts energy output to a load from the Q-axis windings; and
   wherein the system comprises:
      a thyristor modulator to control real and reactive components of power to affect power applied to the load; and
      inductive storage to receive current from the thyristor modulator for boosting the output energy from the Q-axis windings.

\* \* \* \* \*